US011514073B2

(12) United States Patent
Boychev et al.

(10) Patent No.: US 11,514,073 B2
(45) Date of Patent: Nov. 29, 2022

(54) METHODS AND APPARATUS TO GENERATE VIRTUAL RESOURCE PROVISIONING VISUALIZATIONS

(71) Applicant: VMWARE, INC., Palo Alto, CA (US)

(72) Inventors: Yavor Boychev, Sofia (BG); Tony Georgiev, Sofia (BG); Igor Stoyanov, Sofia (BG); Nikola Arnaudov, Sofia (BG); Praneeth Bobba, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 309 days.

(21) Appl. No.: 16/816,299

(22) Filed: Mar. 12, 2020

(65) Prior Publication Data

US 2021/0216567 A1    Jul. 15, 2021

(30) Foreign Application Priority Data

Jan. 14, 2020   (IN) .............................. 202041001645

(51) Int. Cl.
  *G06F 16/26*   (2019.01)
  *H04L 41/06*   (2022.01)
  *H04L 67/10*   (2022.01)
  *G06F 16/23*   (2019.01)

(52) U.S. Cl.
  CPC .......... *G06F 16/26* (2019.01); *G06F 16/2379* (2019.01); *H04L 41/06* (2013.01); *H04L 67/10* (2013.01)

(58) Field of Classification Search
  CPC ..... G06F 16/2379; G06F 16/26; H04L 41/06; H04L 41/0806; H04L 41/22; H04L 41/10

USPC .......................................................... 707/758
  See application file for complete search history.

(56) References Cited

U.S. PATENT DOCUMENTS

| | | | | |
|---|---|---|---|---|
| 8,874,755 | B1* | 10/2014 | Deklich | G06F 15/177 709/225 |
| 9,177,132 | B2* | 11/2015 | Rendahl | H04L 41/08 |
| 10,778,539 | B1* | 9/2020 | Hussain | H04L 41/5054 |
| 2013/0097651 | A1* | 4/2013 | Rendahl | G06F 9/45558 726/1 |
| 2017/0257424 | A1* | 9/2017 | Neogi | H04L 43/16 |
| 2019/0028360 | A1* | 1/2019 | Douglas | H04L 41/22 |
| 2019/0312795 | A1* | 10/2019 | Karve | H04L 41/0806 |

* cited by examiner

*Primary Examiner* — Vincent F Boccio
(74) *Attorney, Agent, or Firm* — Hanley, Flight & Zimmerman, LLC

(57) ABSTRACT

Methods, apparatus, systems and articles of manufacture are disclosed to generate virtual resource provisioning visualizations. An example apparatus includes a visualization generator to generate a visualization based on a comparison of first provisioning requirements from a blueprint to parameters associated with the cloud computing environment, the first provisioning requirements associated with the provisioning of the virtual resource to the cloud computing environment, a blueprint controller to adjust one or more of the first provisioning requirements to one or more second provisioning requirements in response to determining that the first provisioning requirements are not satisfied based on the visualization, and a deployment controller to deploy the virtual resource to the cloud computing environment based on the one or more second provisioning requirements.

28 Claims, 14 Drawing Sheets

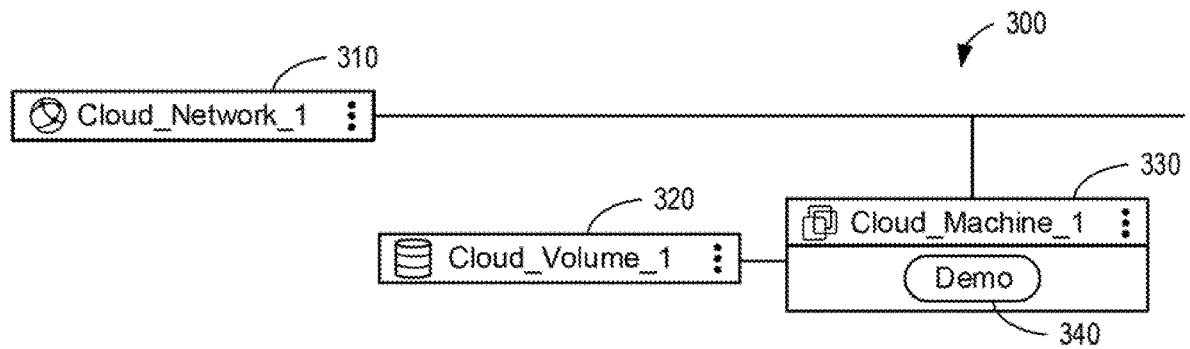

FIG. 3A

```
1   formatVersion: 1
2   inputs: {}
3   resources:
4     Cloud_Network_1:
5       type: Cloud.Network
6       properties:
7         networkType: existing
8     Cloud_Volume_1:
9       type: Cloud.Volume
10      properties:
11        capacityGb: 1
12    Cloud_Machine_1:
13      type: Cloud.Machine
14      properties:
15        image: ubuntu
16        configuration: medium
17        constraints:
18          - tag: demo
19        networks:
20          - network: '${resource.Cloud_Network_1.id}'
21        attachedDisks:
22          - source: '${resource.Cloud_Volume_1.id}'
...   ...
```

FIG. 3B

US 11,514,073 B2

METHODS AND APPARATUS TO GENERATE VIRTUAL RESOURCE PROVISIONING VISUALIZATIONS

RELATED APPLICATIONS

Benefit is claimed under 35 U.S.C. 119(a)-(d) to Foreign Application Serial No. 202041001645 filed in India entitled "METHODS AND APPARATUS TO GENERATE VIRTUAL RESOURCE PROVISIONING VISUALIZATIONS", on Jan. 14, 2020, by VMware, Inc., which is herein incorporated in its entirety by reference for all purposes.

FIELD OF THE DISCLOSURE

This disclosure relates generally to cloud computing and, more particularly, to methods and apparatus to generate virtual resource provisioning visualizations.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

BRIEF DESCRIPTION OF THE DRAWINGS

FIG. 3A is a graphical representation of an example blueprint.

FIG. 3B is a portion of the example blueprint of FIG. 3A in human-readable form.

The figures are not to scale. In general, the same reference numbers will be used throughout the drawing(s) and accompanying written description to refer to the same or like parts.

DETAILED DESCRIPTION

Figure 1:
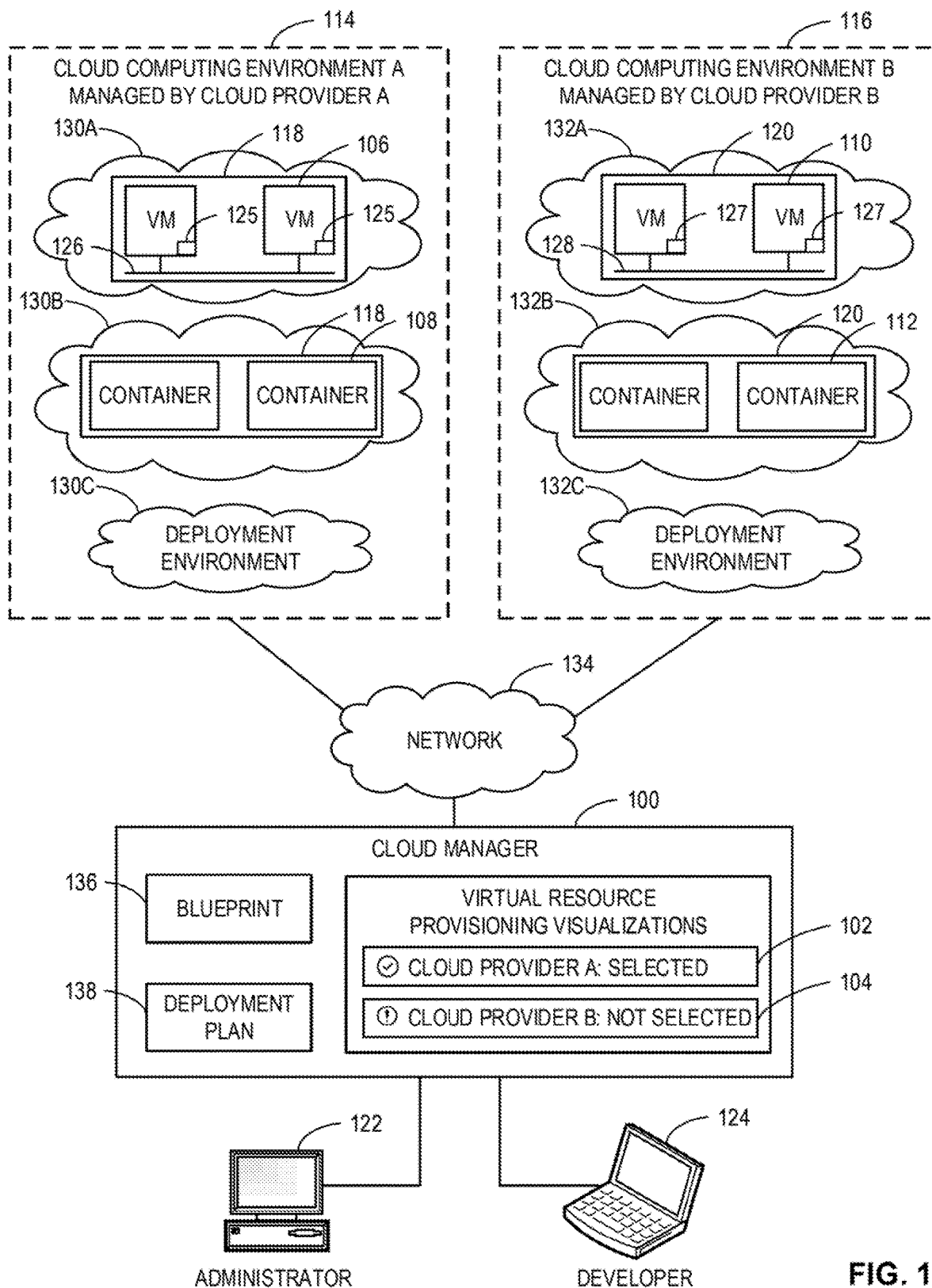
FIG. 1 is a schematic illustration of an example cloud manager to generate example virtual resource provisioning visualizations associated with deploying a virtual resource to an example cloud computing environment.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Cloud computing is based on the deployment of many physical resources across a network, virtualizing the physical resources into virtual resources, and provisioning the virtual resources to perform cloud computing services and applications. In some instances, a virtual machine (VM) is generated based on a compilation of the virtual resources based on the virtualization of corresponding physical resources. A VM is a software computer that, like a physical computer, runs an operating system and applications. An operating system installed on a VM is referred to as a guest operating system. Because each VM is an isolated computing environment, VMs can be used as desktop or workstation environments, as testing environments, to consolidate server applications, etc. VMs can run on hosts or clusters. The same host can run a plurality of VMs, for example.

As used herein, availability refers to the level of redundancy required to provide continuous operation expected for the clusters, and/or, more generally, the cloud computing environment. As used herein, performance refers to the computer processing unit (CPU) operating speeds (e.g., CPU gigahertz (GHz)), memory (e.g., gigabytes (GB) of random access memory (RAM)), mass storage (e.g., GB of hard drive disc(s) (HDD(s)), GB of solid-state drive(s) (SSD(s))), and power capabilities associated with a cloud computing environment. As used herein, capacity refers to the aggregate number of resources (e.g., aggregate storage, aggregate CPU, etc.) across all servers associated with a cluster and/or, more generally, a cloud computing environment. In examples disclosed herein, the number of resources (e.g., capacity) for a cloud computing environment is determined based on the redundancy, the CPU operating speed, the memory, the storage, the security, and/or the power requirements selected by a user. For example, more resources are required for executing one or more applications in a cloud computing environment as the user-selected requirements increase (e.g., higher redundancy, CPU speed, memory, storage, security, and/or power options require more resources than lower redundancy, CPU speed, memory, storage, security, and/or power options).

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a VM. In a full virtualization environment, the VMs do not have direct access to the underlying hardware resources. In a typical full virtualization environment, a host operating system with embedded hypervisor (e.g., VMware ESXi®) is installed on the server hardware. VMs including virtual hardware resources are then deployed on the hypervisor. A guest operating system is installed in the VM. The hypervisor manages the association between the hardware resources of the server hardware and the virtual resources allocated to the VMs (e.g., associating physical RAM with virtual RAM). Typically, in full virtualization, the VM and the guest operating system have no visibility and/or direct access to the hardware resources of the underlying server. Additionally, in full virtualization, a full guest operating system is typically installed in the VM while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a VM and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. VMs including virtual hardware resources are then deployed on the hypervisor. The hypervisor manages the association between the hardware resources (e.g., the physical hardware resources) of the server hardware and the virtual resources allocated to the VMs (e.g., associating physical RAM with virtual RAM). In paravirtualization, the guest operating system installed in the VM is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the VM) may be more efficient, may allow for performance of operations that are not supported by the VM and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a VM of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated from other processes executing on the host operating system. Thus, operating system virtualization provides isolation and resource management capabilities without the resource overhead utilized by a full virtualization environment or a paravirtualization environment. Alternatively, the host operating system may be installed in a VM of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by two or more of a full virtualization environment, a paravirtualization environment, and an operating system virtualization environment. In such a data center, a workload may be deployed to any of the virtualization environments.

Cloud computing platforms may provide many powerful capabilities for performing computing operations. However, taking advantage of these computing capabilities manually may be complex and/or require significant training and/or expertise. Prior techniques to provide cloud computing platforms and services often require customers to understand details and configurations of hardware and software resources to establish and configure the cloud computing platform.

Cloud management platforms, such as VMware vRealize® Automation™, enable end users to provision cloud or virtual resources (e.g., VMs, containers, virtual networks, volumes, etc.) in private, public, and/or hybrid clouds by utilizing cloud-agnostic blueprints. In some disclosed examples, a blueprint can include virtual environment information, virtual resource information, firmware and/or software information, etc., that can be used to establish, execute, and manage a cloud computing platform. For example, a blueprint can generally capture the structure of an application as a collection of application components executing on virtual computing resources.

The cloud management platforms can provision requested resources defined and/or otherwise specified in a blueprint to a corresponding cloud endpoint that leverages a complex policy-based provisioning engine. A cloud endpoint can be a software account or entity that has access to configuration information of one(s) of the virtual resource(s) of a cloud computing platform of interest, and the cloud endpoint can execute instructions in the virtual resource(s). For example, the cloud endpoint can be provided with root access or administrator-level access to one or more VMs in a cloud computing platform.

To determine where the requested resources are to be provisioned, the provisioning engine can evaluate a set of cloud-agnostic policies and rules. For instance, the provisioning engine can compare a set of constraints, requirements, etc., included in the blueprint to characteristics or parameters of the corresponding cloud endpoints during a provisioning lifecycle. As the number of resources and the corresponding connections, dependencies, etc., between the resources increases, the process of selecting a suitable cloud endpoint that satisfies all of the constraints, the requirements, etc., for the blueprint to be provisioned successfully becomes increasingly complex. Accordingly, a lack of visibility of the underlying considerations, reasoning, and decisions used by the provisioning engine can frustrate an end user, such as a cloud administrator or developer, when determining why a certain endpoint has been chosen for the deployment of the requested virtual resources.

Examples disclosed herein include an example cloud manager to improve visibility during a provisioning lifecycle of virtual resources to a cloud computing environment by generating provisioning visualizations (e.g., virtual resource provisioning visualizations). As used herein, the provisioning visualizations are graphical representations of a decision-making process executed by a policy-based provisioning engine. In some disclosed examples, the provisioning visualizations are graphical displays (e.g., user interfaces) that include one or more graphical display sections (e.g., dialog boxes, window panes, etc., that can include one or more buttons (e.g., radio buttons), graphics, icons, etc., or any other graphical control element) that can include information associated with a cloud provider and/or, more generally, a cloud computing environment managed and/or otherwise hosted by the cloud provider. In some disclosed examples, the cloud manager generates a provisioning visualization for respective stages of a provisioning lifecycle. The provisioning visualizations correspond to user-interface models that can expose and/or otherwise provide the reasoning, rationale, etc., associated with the determination of which one(s) of requested provisioning requirement(s) are satisfied and which one(s) are not satisfied. Advantageously, the example cloud manager can generate the provisioning visualizations to improve the compatibility between a cloud endpoint and requested provisioning requirements and, thus, improve operation of a deployed cloud computing environment to execute application(s) or computing workloads.

FIG. 1 is a schematic illustration of an example cloud manager 100 to generate example provisioning visualizations (e.g., virtual resource provisioning visualizations) 102, 104 associated with deploying example virtual resources 106, 108, 110, 112 to one(s) of example cloud computing environments 114, 116. For example, the provisioning visualizations 102, 104 can be graphical representations (e.g., user interfaces to be displayed on display device(s) of computing device(s)) of respective one(s) of stage(s) of a workflow to provision one(s) of the virtual resources 106, 108, 110, 112 to the one(s) of the cloud computing environments 114, 116. In such examples, the provisioning visualizations 102, 104 can be are graphical displays (e.g., user interfaces) that include one or more graphical display sections that can include information associated with one(s) of cloud provider(s) and/or, more generally, one(s) of the cloud computing environments 114, 116 managed and/or otherwise hosted by the one(s) of the cloud provider(s). In the example of FIG. 1, the cloud computing environments 114, 116 are virtual environments (e.g., virtual computing environments) that effectuate execution of example applications 118, 120.

In the illustrated example of FIG. 1, the cloud manager 100 deploys and manages the cloud computing environments 114, 116 that are hosted by cloud providers. For example, a cloud provider can be a cloud computing platform provider that provisions virtual computing resources (e.g., virtual machines, or "VMs," 106, 110) that can be accessed by users of the cloud provider (e.g., users associated with an example administrator 122 and/or an example developer 124) and/or other programs, software, devices, etc., and/or a combination thereof. In the example of FIG. 1, the cloud computing environments 114, 116 include (1) a first example cloud computing environment (CLOUD COMPUTING ENVIRONMENT A) 114 that is managed by a first cloud provider (CLOUD PROVIDER A) and (2) a second example cloud computing environment (CLOUD COMPUTING ENVIRONMENT B) 116 that is managed by a second cloud provider (CLOUD PROVIDER B).

The applications 118, 120 of the example of FIG. 1 include multiple VMs 106, 110. The VMs 106, 110 of the example of FIG. 1 provide different functions within the applications 118, 120 (e.g., services, portions of the applications 118, 120, etc.). One or more of the VMs 106, 110 of the illustrated example are customized by the administrator 122 and/or the developer 124 of the applications 118, 120. For example, the administrator 122 and/or the developer 124 can customize the applications 118, 120 relative to a stock or out-of-the-box (e.g., commonly available purchased copy) version of the services and/or application components.

In the example of FIG. 1, the VMs 106, 110 include first VMs 106 and second VMs 110. In the example of FIG. 1, the first VMs 106 are communicatively coupled to each other via a first example network (e.g., a virtualized network) 126. In the example of FIG. 1, the second VMs 110 are communicatively coupled to each other via a second example network 128. Additionally, the services executing on one(s) of the VMs 106, 110 can have dependencies on other one(s) of the VMs 106, 110. For example, a first virtual resource (e.g., a compute resource, a network resource, a security resource, a storage resource, etc.) associated with a first one of the first VMs 106 can be dependent and/or otherwise have a dependency on a second virtual resource associated with the first one of the first VMs 106, a second one of the first VMs 106, etc.

As illustrated in the example of FIG. 1, the cloud computing environments 114, 116 can provide multiple example deployment environments 130A-C, 132A-C, for example, for development, testing, staging, and/or production of the applications 118, 120. In the example of FIG. 1, the deployment environments 130A-C, 132A-C include first example deployment environments 130A, 132A to execute the respective applications 118, 120, second example deployment environments 130B, 132B to execute example containers (e.g., container images) 108, 112, and third example deployment environments 130C, 132C executing as development environments. Alternatively, fewer or more than the deployment environments 130A-C, 132A-C depicted in FIG. 1 may be used.

The administrator 122, the developer 124, other programs, and/or other devices may access services from the cloud provider (e.g., CLOUD PROVIDER A, CLOUD PROVIDER B), for example, via Representational State Transfer (REST) Application Programming Interfaces (APIs) and/or via any other client-server communication protocol. Example implementations of a REST API for cloud computing services include a vCloud Automation Center™ (vCAC) and/or vRealize® Automation™ (vRA) API and a vCloud Director™ API available from VMware®, Inc. The cloud provider provisions virtual computing resources (e.g., the VMs 106, 110) to provide the deployment environments 130A-C, 132A-C in which the administrator 122 and/or the developer 124 can deploy multi-tier application(s), such as the applications 118, 120. An example implementation of a deployment environment that may be used to implement the deployment environments 130A-C, 132A-C of FIG. 1 is vCAC or vRA cloud computing services available from VMware®, Inc.

In some examples disclosed herein, a lighter-weight virtualization is employed by using the containers 108, 112 in place of the VMs 106, 110 in the second deployment environments 130B, 132B. Containers 108, 112 or container images are software constructs that run on top of a host operating system without the need for a hypervisor or a separate guest operating system. Unlike the VMs 106, 110, the containers 108, 112 do not instantiate their own operating systems Like the VMs 106, 110, the containers 108, 112 are logically separate from one another. Numerous ones of the containers 108, 112 can run on a single computer, processor system, and/or in the same second deployment environment 130B, 132B. Also, like the VMs 106, 110, the containers 108, 112 can execute instances of applications or programs (e.g., the applications 118, 120) separate from application/program instances executed by the other containers 108, 112 in the same deployment environment 130B, 132B.

In the example of FIG. 1, the cloud manager 100 deploys and manages the applications 118, 120 via a third example network 134. The third network 134 of the illustrated example of FIG. 1 is the Internet. However, the third network 134 can be implemented using any suitable wired and/or wireless network(s) including, for example, one or more data buses, one or more Local Area Networks (LANs), one or more wireless LANs, one or more cellular networks, one or more private networks, one or more public networks, etc. The third network 134 enables the cloud manager 100 to be in communication with at least one of the first cloud computing environment 114 or the second cloud computing environment 116.

In the illustrated example of FIG. 1, the cloud manager 100 orchestrates deployment of multi-tier applications, such as the applications 118, 120, onto one of the deployment environments 130A-C, 132A-C based on an example blueprint 136. For example, the cloud manager 100 can invoke the cloud providers to provision virtual resources, such as compute, network, security, storage, etc., resources to build and/or otherwise provision the VMs 106, 110 to the cloud computing environments 114, 116. In such examples, the cloud manager 100 can invoke one(s) of the cloud providers to execute a computing action in connection with at least one of the deployment environments 130A-c, 132A-C by triggering, calling, and/or otherwise invoking one or more APIs.

In the example of FIG. 1, the cloud manager 100 is a web-based application (e.g., a SaaS application, a remote application, an application hosted by one or more servers, etc.) that can be accessed by the administrator 122, the developer 124, etc. In such examples, the cloud manager 100 can be a subscription-based service accessed by a user, such as the administrator 122, the developer 124, etc. In some examples, the cloud manager 100 can be an application that is installed and/or executed on a local machine, such as a laptop, a desktop, etc., or any other processor platform managed or operated by the administrator 122, the developer 124, etc.

In some examples, the cloud manager 100 obtains credentials (e.g., a user name, a password, etc.) associated with an account (e.g., an endpoint account, an example cloud endpoint 125, 127, etc.) of the administrator 122, the developer 124, etc., of the cloud provider. In some examples, the cloud manager 100 obtains a security certificate, server-identifying information (e.g., a uniform resource locator (URL), an Internet Protocol (IP) address, an IP port, etc.), etc.

In the illustrated example of FIG. 1, the endpoints (e.g., the cloud endpoints, the VM endpoints, etc.) 125, 127, can be software accounts or entities that have access to configuration information of the VMs 106, 110 and can execute instructions in the VMs 106, 110. For example, the endpoints 125, 127 can be provided with root access or administrator-level access to a respective one of the VMs 106, 110. Examples disclosed herein can request information from the VMs 106, 110 and/or instruct the VMs 106, 110 to execute instructions via the respective endpoint 125, 127. For example, a first one of the endpoints 125, 127 executing on a first one of the first VMs 106 can expose one or more APIs for providing commands the first one of the first VMs 106 using the exposed API(s).

In some examples, the cloud manager 100 manages the obtention, creation, and/or modification of the blueprint 136. In some examples, the blueprint 136 is a basic blueprint that specifies a logical topology of an application to be deployed. A basic blueprint is a definition of policies (e.g., hardware policies, security policies, network policies, etc.) for a single machine (e.g., a single virtual machine such as a web server virtual machine and/or container). In some examples, the blueprint 136 is a multi-machine blueprint that defines the attributes of multiple virtual machines as a single group that can be provisioned, deployed, managed, etc., as a single unit. For example, a multi-machine blueprint can include definitions for multiple basic blueprints that make up a service (e.g., an e-commerce provider that includes web servers, application servers, and database servers). Accordingly, the cloud manager 100 facilitates more efficient management of multiple virtual machines and/or containers than manually managing (e.g., deploying) basic blueprints individually.

The example blueprint 136, also referred to herein as an application blueprint, generally captures the structure of an application as a collection of application components executing on virtual computing resources. For example, the blueprint 136 obtained by and/or generated by the cloud manager 100 for an online store application can specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications, such as the applications 118, 120, can be distributed across multiple VMs, such as the first VMs 106, the second VMs 110, etc. Thus, in the example described above, the term "application" refers to the entire online store application, including application server and database components, rather than just the web application itself. In some instances, the application can include the underlying hardware and/or virtual computing hardware utilized to implement the components.

The example cloud manager 100 of FIG. 1 additionally annotates the blueprint 136 (e.g., a basic blueprint and/or a multi-machine blueprint) to control how workflows associated with the basic blueprint and/or multi-machine blueprint is/are executed. For example, the cloud manager 100 can store the blueprint 136, a modified one of the blueprint 136, an annotated one of the blueprint 136, etc. As used herein, a workflow is a series of actions and decisions to be executed in a virtual computing platform, such as the cloud computing environment 114, 116. For example, the cloud manager 100 can generate a workflow based on the blueprint 136 to provision the cloud computing environment 114, 116 with the VMs 106, 110, the containers 108, 112, and/or corresponding firmware and/or software. In such examples, the workflow can correspond to a provisioning lifecycle including one or more stages (e.g., lifecycle stages, provisioning stages, provisioning lifecycle stages, etc.). The provisioning lifecycle can include stages, such as a storage allocation stage, a network allocation stage, a machine allocation stage, a network provisioning stage, a storage provisioning stage, a machine provisioning stage, etc., described below in connection with FIGS. 4-9.

The cloud manager 100 of the example of FIG. 1 generates an example deployment plan 138 based on the blueprint 136 that includes deployment settings for the blueprint 136 (e.g., virtual computing resources' cluster size, CPU, memory, networks, etc.) and an execution plan of tasks having a specified order in which virtual computing resources are provisioned and application components are installed, configured, and started. For example, the deployment plan 138 can be based on the workflow generated by the blueprint 136. In such examples, the deployment plan 138 can include, correspond to, and/or otherwise be representative of a provisioning lifecycle.

The example cloud manager 100 generates the deployment plan 138 to provide an IT administrator (e.g., the administrator 122) with a process-oriented view of the blueprint 136 that indicates discrete actions to be performed to deploy one(s) of the applications 118, 120. Different deployment plans can be generated from a single instance of the blueprint 136 to test prototypes (e.g., new application versions), to scale up and/or scale down deployments, and/or to deploy the application to different ones of the deployment environments 130A-C, 132A-C (e.g., testing, staging, production, etc.). The cloud manager 100 can separate and distribute the deployment plan 138 as local deployment plans having a series of tasks to be executed by the VMs 106, 110 provisioned from the deployment environments 130A-C, 13A-C. Each VM 106, 110 can coordinate execution of each task with a centralized deployment module (e.g., the cloud endpoint 125) to ensure that tasks are executed in an order that complies with dependencies specified in the blueprint 136.

The cloud manager 100 of the example of FIG. 1 executes the deployment plan 138 based on the blueprint 136 by communicating with a respective one of the cloud providers to provision and configure the VMs 106, 110 in the deployment environments 130A-C, 132A-C. The cloud manager 100 provides each VM 106, 110 with a series of tasks specific to the receiving VM 106, 110 (e.g., a local deployment plan). Tasks are executed by the VMs 106, 110 to install, configure, and/or start one or more application components. For example, a task can be a script that, when executed by a VM 106, 110, causes the VM 106, 110 to retrieve and install particular software packages. The cloud manager 100 coordinates with the VMs 106, 110 to execute the tasks in an order that observes installation dependencies between VMs 106, 110 according to the deployment plan 138.

In the example of FIG. 1, the cloud manager 100 obtains a request from one(s) of the administrator 122 and/or the developer 124 to deploy a virtual resource to a cloud computing environment. In such examples, the request can be the blueprint 136 and/or otherwise be based on the blueprint 136. For example, the cloud manager 100 can determine provisioning requirements based on the blueprint 136. In such examples, the cloud manager 100 can extract from and/or otherwise determine the provisioning requirements based on the blueprint 136. For example, the blueprint 136 can include parameters, specifications, settings, etc., associated with provisioning the virtual resource.

In some examples, the cloud manager 100 obtains data or information (e.g., cloud provider, data, cloud provider information, etc.), parameters (e.g., cloud provider parameters) of the cloud providers. For example, the cloud manager 100 can obtain the cloud provider parameters from the cloud provider. In other examples, the cloud manager 100 can obtain the cloud provider parameters from one(s) of the endpoints 125, 127. In some examples, the cloud provider parameters include inventories, specifications, settings, etc., associated with virtual resource(s) instantiated and/or otherwise deployed (e.g., already deployed, previously deployed, current deployed, etc.) in the cloud computing environments 114, 116.

In some examples, the cloud manager 100 determines whether to deploy the virtual resource to the first cloud computing environment 114 or the second cloud computing environment 116. For example, the cloud manager 100 can compare the provisioning requirements based on the blueprint 136 to cloud provider parameters associated with the cloud computing environments 114, 116 hosted by the cloud providers. In an example where the virtual resource is a storage resource (e.g., a cloud volume, a storage volume, etc.), a first provisioning requirement can be that a provisioned storage resource is to have 10 GB in spare capacity and a first cloud provider parameter can be that one of the first VMs 106 in the first cloud computing environment 114 has a storage resource with at least 10 GB in available storage capacity. In such examples, the cloud manager 100 can determine that the first provisioning requirement can be satisfied by the first cloud provider parameter.

The example cloud manager 100 of FIG. 1 can generate the provisioning visualizations 102, 104 based on the comparisons of the provisioning requirements and the cloud provider parameters. In the example of FIG. 1, the provisioning visualizations 102, 104 include a first example provisioning visualization 102 and a second example provisioning visualization 104. In the example of FIG. 1, the cloud manager 100 can generate the first provisioning visualization 102 in response to determining that the first provisioning requirement is satisfied by the first cloud provider parameter associated with Cloud Provider A. In the example of FIG. 1, the cloud manager 100 can generate the second provisioning visualization 104 in response to determining that the first provisioning requirement is not satisfied by a second cloud provider parameter associated with Cloud Provider B. In the example of FIG. 1, in response to selecting Cloud Provider A based on the provisioning visualizations 102, 104, the cloud manager 100 can deploy the virtual resource to the first cloud computing environment 114 managed by Cloud Provider A.

Figure 2:
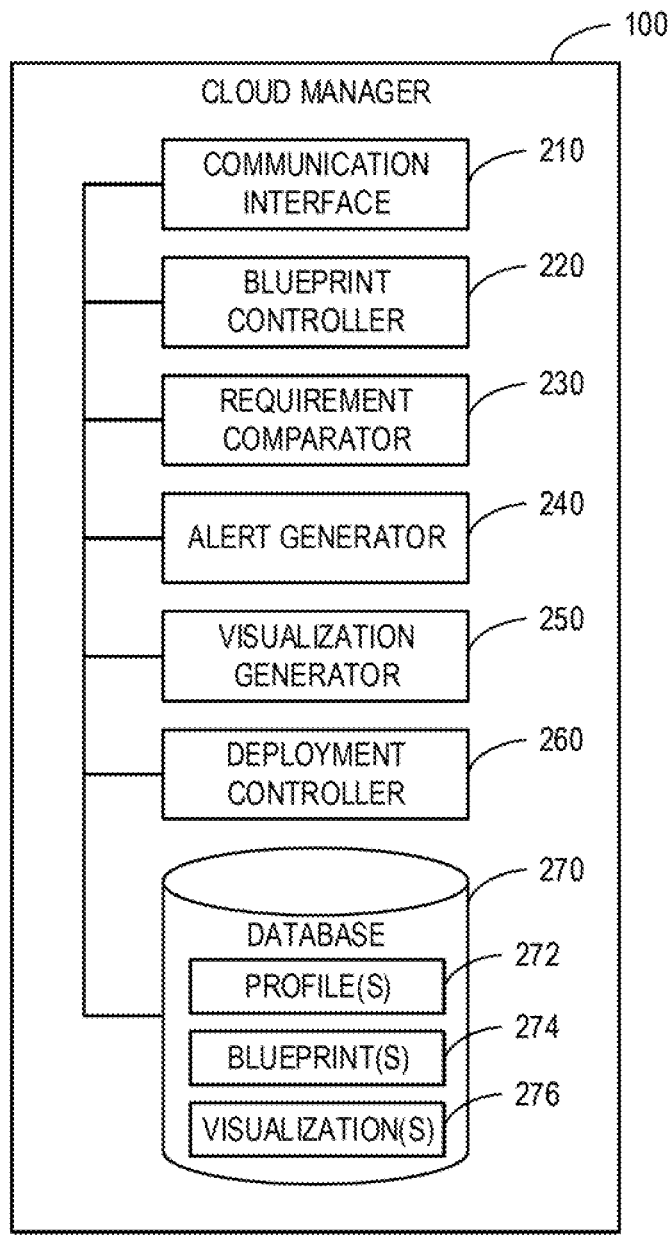
FIG. 2 is a block diagram of the example cloud manager of FIG. 1.

FIG. 2 is a block diagram of the example cloud manager 100 of FIG. 1. In the example of FIG. 2, the cloud manager 100 includes an example communication interface 210, an example blueprint controller 220, an example requirement comparator 230, an example alert generator 240, an example visualization generator 250, an example deployment controller 260, and an example database 270. In the example of FIG. 2, the database 270 includes example profile(s) 272, example blueprint(s) 274, and example visualization(s) 276.

In the illustrated example of FIG. 2, the cloud manager 100 includes the communication interface 210 to obtain data or information from and/or transmit information to the administrator 122, the developer 124, and/or the third network 134 of FIG. 1. In the example of FIG. 2, the communication interface 210 implements a web server that receives management or monitoring information from the cloud providers via the third network 134, data or information from the administrator 122, the developer 124, etc. In some examples, information transmitted or received by the communication interface 210 is formatted as an HTTP message. However, any other message format and/or protocol may additionally or alternatively be used such as, for example, a file transfer protocol (FTP), a simple message transfer protocol (SMTP), an HTTP secure (HTTPS) protocol, etc.

In some examples, the communication interface 210 obtains a request to provision a virtual resource to one(s) of the cloud computing environments 114, 116 (FIG. 1). For example, the communication interface 210 can obtain the blueprint 136 (FIG. 1) from the administrator 122, the developer 124, etc., to provision one or more virtual resources to one(s) of the cloud computing environments 114, 116 (FIG. 1). For example, the communication interface 210 can obtain the blueprint 136, an adjustment or modification to the blueprint 136, etc., from the administrator 122, the developer 124. In other examples, the communication interface 210 can obtain information associated with the endpoints 125, 127 of FIG. 1, such as login or other administrative credentials required to access and/or otherwise manage the endpoints 125, 127.

In some examples, the communication interface 210 obtains information from the cloud computing environments 114, 116 via the third network 134. For example, the communication interface 210 can obtain cloud provider parameters from one(s) of the endpoints 125, 127. In some examples, the communication interface 210 facilitates the deployment of virtual resource(s) to the cloud computing environments 114, 116. For example, the communication interface 210 can transmit a request, a command, an instruction, etc., to one(s) of the cloud computing environments 114, 116 that can cause the cloud provider(s) to provision one(s) of the VMs 106, 110, one(s) of the containers 108, 112, to one(s) of the deployment environments 130A-C, 132A-C.

In the illustrated example of FIG. 2, the cloud manager 100 includes the blueprint controller 220 to obtain, adjust, and/or execute a blueprint, such as the blueprint 136 of FIG. 1. In some examples, the blueprint controller 220 determines provisioning requirements based on the blueprint 136. For example, the blueprint controller 220 can extract a constraint, a configuration, a setting, etc., from the blueprint 136 associated with provisioning a virtual resource. In such examples, the blueprint controller 220 can extract requirements from the blueprint 136 that are associated with an image (e.g., an image type, an image version, etc.), a configuration or flavor (e.g., a small, medium, or large configuration), etc., to deploy a VM. For example, a configuration can be a pre-defined or preset cloud configuration, deployment type, deployment configuration, etc. In such examples, a configuration can include a number of virtual CPUs that a deployment instance based on the configuration can use, a quantity of GB of RAM for a VM instantiated from the configuration, a quantity of GB used for a root partition of the deployment instance, a quantity of ephemeral disk GB, a quantity of MB of swap space, etc. In such examples, different combinations of such parameters can correspond to a small, medium, or large configuration where increasing parameter values can correspond to an increase in capacity. In other examples, the blueprint controller 220 can extract provisioning requirements from the blueprint 136 such as availability, performance, and/or capacity requirements.

In some examples, the blueprint controller 220 determines cloud provider parameters of a cloud provider. For example, the blueprint controller 220 can obtain credential information (e.g., a user name and/or password included in and/or otherwise associated with the blueprint 136). In such examples, the blueprint controller 220 can use or leverage the credential information to login and/or otherwise access (e.g., access via the communication interface 210) the cloud computing environments 114, 116 managed by Cloud Provider A and/or Cloud Provider B. In such examples, the blueprint controller 220 can request cloud provider parameters associated with the cloud computing environments 114, 116 via one(s) of the endpoints 125, 127.

In some examples, the blueprint controller 220 adjusts provisioning requirements based on a provisioning visualization. For example, the blueprint controller 220 can adjust and/or otherwise modify the blueprint 136 based on one or more provisioning requirements associated with the blueprint 136 not being satisfied by one(s) of the cloud provider parameters. In such examples, the blueprint controller 220 can select a provisioning requirement to process and adjust the selected provisioning requirement to satisfy a corresponding cloud provider parameter. In some examples, the blueprint controller 220 generates a new blueprint based on the adjusted provisioning requirement. In such examples, the blueprint controller 220 can store the new blueprint in the database 270 as one of the blueprint(s) 274.

In the illustrated example of FIG. 2, the cloud manager 100 includes the requirement comparator 230 to compare provisioning requirement(s) to cloud provider parameter(s). In some examples, the requirement comparator 230 determines whether one(s) of the provisioning requirement(s) meet and/or otherwise satisfy corresponding one(s) of the cloud provider parameter(s) based on the comparison(s).

In some examples, the requirement comparator 230 determines that a first provisioning requirement does not satisfy a first cloud provider parameter because the first provisioning requirement does not match (e.g., substantially match, exactly match, etc.) the first cloud provider parameter. In other examples, the requirement comparator 230 can determine that a first provisioning requirement satisfies a first cloud provider parameter because the first provisioning requirement is less than, not as strict as, and/or is otherwise not as stringent as the first cloud provider parameter. For example, the first provisioning requirement can be a requirement for 5 GB of storage and the first cloud provider parameter can be 10 GB of storage (e.g., the first cloud environment 114 has 10 GB of storage capacity, 10 GB of available storage for allocation or use in execution of the application 118 of FIG. 1, etc.). In such examples, the requirement comparator 230 can determine that the first provisioning requirement satisfies the first cloud provider parameter because the first provisioning requirement of 5 GB of storage is less than the cloud provider parameter of 10 GB of storage. In other examples, if the first provisioning requirement is a requirement for 50 GB of storage and the first cloud provider parameter is a value representative of 25 GB of storage, then the requirement comparator 230 can determine that the first provisioning requirement does not satisfy the first cloud provider parameter because the first cloud provider parameter is less than the first cloud provider parameter (e.g., the first provisioning requirement is greater than the first cloud provider parameter).

In some examples, the first provisioning requirement can be a requirement for two load balancers each having a software version of at least 6.0 and the first cloud provider parameter can be five load balancers each having a software version of 6.5 (e.g., the first cloud computing environment 114 having five load balancers each having a software version of 6.5 that are available for allocation or use in execution of the application 118 of FIG. 1, etc.). In such examples, the requirement comparator 230 can determine that the first provisioning requirement satisfies the first cloud provider parameter because the first provisioning requirement two load balancers each having a software version of at least 6.0 can be met by the first cloud provider parameter of five load balancers each having a software version of 6.5. In some such examples, the requirement comparator 230 can determine that the first provisioning requirement satisfies the first cloud provider parameter because the first provisioning requirement is less than and/or otherwise not as stringent as the first cloud parameter (e.g., value(s) representative of the first cloud parameter).

In some examples, the requirement comparator 230 compares requirements by processing layers (e.g., display layers, user interface layers, visualization layers, etc.) of the visualizations 102, 104 of FIG. 1. For example, as described below in connection with FIGS. 4-9, the visualizations 102, 104 can include one or more layers representative of and/or otherwise corresponding to cloud provider parameters. In such examples, the requirement comparator 230 can compare a cloud provider parameter of a visualization layer to a corresponding provisioning requirement. Based on the comparison, the requirement comparator 230 can determine whether the provisioning requirement satisfies the cloud provider parameter.

In some examples, in response to the requirement comparator 230 determining that the provisioning requirement satisfies the cloud provider parameter of the visualization layer, the requirement comparator 230 can identify the visualization layer as a compatible, compliant, satisfactory, etc., visualization layer. In some examples, in response to the requirement comparator 230 determining that the provisioning requirement does not satisfy the cloud provider parameter of the visualization layer (e.g., the provisioning requirement is not met by the cloud provider parameter, the provisioning requirement is greater than, more strict or stringent than the first cloud provider parameter, etc.), the requirement comparator 230 can identify the visualization layer as a non-compatible, non-compliant, non-satisfactory, etc., visualization layer. In such examples, in response to the requirement comparator 230 identifying the visualization layer as a non-compliant visualization layer, the requirement comparator 230 can identify the cloud computing environment as a non-compliant cloud computing environment, the cloud provider as a non-compliant cloud provider, etc., and/or a combination thereof.

In the illustrated example of FIG. 2, the cloud manager 100 includes the alert generator 240 to generate an alert based on the visualizations 102, 104 of FIG. 1. In some examples, the alert generator 240 can generate and transmit an alert to the administrator 122, the developer 124, the third network 134, etc., and/or a combination thereof. For example, the alert generator 240 can propagate the alert to one(s) of the cloud computing environments 114, 116 or any other computing device, software application, etc., in communication with the cloud computing environments 114, 116 and/or, more generally, the cloud providers.

In some examples, the alert generator 240 generates the alert to include information associated with a visualization layer being compliant, non-compliant, etc. For example, the alert can include one or more provisioning requirements that are non-compliant and/or otherwise do not satisfy one or more corresponding cloud provider parameters. In such examples, the alert can include a first provisioning requirement of 10 GB of storage that is not met by 5 GB of storage hosted by the cloud provider associated with the first cloud computing environment 114 of FIG. 1. In some examples, the alert generator 240 generates the alert to include information associated with one(s) of the cloud computing environments 114, 116 being compliant, non-compliant, etc. In some examples, the alert generator 240 generates the alert to include information associated with selecting one(s) of the cloud computing environments 114, 116 to provision virtual resource(s) of interest. In some examples, the alert generator 240 generates the alert to include the information as described above and/or one(s) of the visualizations 102, 104 of FIG. 1.

In the illustrated example of FIG. 2, the cloud manager 100 includes the visualization generator 250 to generate a provisioning visualization, such as the provisioning visualizations 102, 104 of FIG. 1. For example, the visualization generator 250 can generate one or more layers (e.g., visualization layers) of a user interface (e.g., a graphical user interface, a visual user interface, etc.). In such examples, the user interface can be transmitted to the administrator 122, the developer 124, etc., (e.g., a computing device having a display device that is owned, managed, operated, etc., by the administrator 122, the developer 124, etc.). For example, the user interface(s) generated by the visualization generator 250 can be displayed on one or more display devices to be viewed by a user (e.g., the administrator 122, the developer 124, etc.).

In some examples, the visualization generator 250 generates a provisioning visualization for a stage of a provisioning lifecycle. For example, the visualization generator 250 can generate a first provisioning visualization, such as a storage allocation provisioning visualization, for a storage allocation stage of a provisioning lifecycle for a virtual resource. In such examples, the storage allocation provisioning visualization can correspond to the example visualization depicted in the example of FIG. 4.

In some examples, the visualization generator 250 generates a second provisioning visualization, such as a network allocation provisioning visualization, for a network allocation stage of the provisioning lifecycle for the virtual resource. In such examples, the network allocation provisioning visualization can correspond to the example visualization depicted in the example of FIG. 5.

In some examples, the visualization generator 250 generates a third provisioning visualization, such as a machine allocation provisioning visualization, for a machine allocation stage of the provisioning lifecycle for the virtual resource. In such examples, the machine allocation provisioning visualization can correspond to the example visualization depicted in the example of FIG. 6.

In some examples, the visualization generator 250 generates a fourth provisioning visualization, such as a network provisioning visualization, for a network provisioning stage of the provisioning lifecycle for the virtual resource. In such examples, the network provisioning visualization can correspond to the example visualization depicted in the example of FIG. 7.

In some examples, the visualization generator 250 generates a fifth provisioning visualization, such as a storage provisioning visualization, for a storage provisioning stage of the provisioning lifecycle for the virtual resource. In such examples, the storage provisioning visualization can correspond to the example visualization depicted in the example of FIG. 8.

In some examples, the visualization generator 250 generates a sixth provisioning visualization, such as a machine provisioning visualization, for a machine provisioning stage of the provisioning lifecycle for the virtual resource. In such examples, the machine provisioning visualization can correspond to the example visualization depicted in the example of FIG. 9.

In the illustrated example of FIG. 2, the cloud manager 100 includes the deployment controller 260 to deploy and/or otherwise provision virtual resources, such as compute, storage, security, network, etc., resources to build and/or otherwise provision virtual resource(s), such as the VMs 106, 110, the containers 108, 112, etc., to one(s) of the cloud computing environments 114, 116. For example, the deployment controller 260 can cause the deployment, the provisioning, etc., of the virtual resource(s) by commanding, instructing, and/or otherwise invoking the cloud provider(s) to provision the virtual resource(s) based on the blueprint 136 by executing the deployment plan 138 of FIG. 1. In such examples, the deployment controller 260 can configure and/or otherwise modify one(s) of the VMs 106, 110, the containers 108, 112, etc., and/or a combination thereof for deployment to one(s) of the cloud computing environments 114, 116.

In the illustrated example of FIG. 2, the cloud manager 100 includes the database 270 to record data (e.g., the profile(s) 272, the blueprint(s) 274, the visualization(s) 276, etc.). For example, the database 270 can store one or more profiles 272 associated with cloud provider(s). In such examples, the profile(s) 272 can be a software account or entity that can be used to login and/or otherwise access the cloud computing environments 114, 116 hosted by the cloud providers. In such examples, the profile(s) 272 can include a user name, a password, a security certificate, or any other type of access credential. In the example of FIG. 2, the blueprint(s) 274 can include one or more basic blueprints, multi-machine blueprints, etc., and/or a combination thereof. In such examples, one or more of the blueprint(s) 274 of FIG. 2 can correspond to the blueprint 136 of FIG. 1. In the example of FIG. 2, the visualization(s) 276 can include one or more provisioning visualizations (e.g., virtual resource provisioning visualizations). In such examples, one or more of the visualization(s) 276 can correspond to one(s) of the visualizations 102, 104 of FIG. 1.

The example database 270 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 270 may additionally or alternatively be implemented by one or more double data rate (DDR) memories, such as DDR, DDR2, DDR3, DDR4, mobile DDR (mDDR), etc. The database 270 may additionally or alternatively be implemented by one or more mass storage devices such as hard disk drive(s), compact disk drive(s), digital versatile disk drive(s), solid-state disk drive(s), etc. While in the illustrated example the database 270 is illustrated as a single database, the database 270 may be implemented by any number and/or type(s) of databases. Furthermore, the data stored in the database 270 may be in any data format such as, for example, binary data, comma delimited data, tab delimited data, structured query language (SQL) structures, etc.

While an example manner of implementing the cloud manager 100 of FIG. 1 is illustrated in FIG. 2, one or more of the elements, processes, and/or devices illustrated in FIG. 2 may be combined, divided, re-arranged, omitted, eliminated, and/or implemented in any other way. Further, the example communication interface 210, the example blueprint controller 220, the example requirement comparator 230, the example alert generator 240, the example visualization generator 250, the example deployment controller 260, the example database 270, the example profile(s) 272, the example blueprint(s) 274, the example visualization(s) 276, and/or, more generally, the example cloud manager 100 of FIG. 1 may be implemented by hardware, software, firmware and/or any combination of hardware, software, and/or firmware. Thus, for example, any of the example communication interface 210, the example blueprint controller 220, the example requirement comparator 230, the example alert generator 240, the example visualization generator 250, the example deployment controller 260, the example database 270, the example profile(s) 272, the example blueprint(s) 274, the example visualization(s) 276, and/or, more generally, the example cloud manager 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 210, the example blueprint controller 220, the example requirement comparator 230, the example alert generator 240, the example visualization generator 250, the example deployment controller 260, the example database 270, the example profile(s) 272, the example blueprint(s) 274, and/or the example visualization(s) 276 is/are hereby expressly defined to include a non-transitory computer readable storage device or storage disk such as a memory, a digital versatile disk (DVD), a compact disk (CD), a Blu-ray disk, etc. including the software and/or firmware. Further still, the example cloud manager 100 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In the illustrated example of FIG. 2, the cloud manager 100 includes means for obtaining a command, an instruction, an invocation, etc., from a computing device (e.g., a computing device associated with the administrator 122, the developer 124, etc., or any other computing device) to modify a blueprint (e.g., the blueprint 136 of FIG. 1, the blueprint(s) 274 of FIG. 2, the blueprint 300 of FIG. 3A, the blueprint 350 of FIG. 3B, etc.). In this example, the means for obtaining is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the means for obtaining is implemented by any physical and/or virtual gateway, switch (e.g., a spline switch, a top-of-the-rack (ToR) switch, etc.), router, or other network interface. In some examples, the means for obtaining is implemented by any type of interface standard, such as an Ethernet interface, a universal serial bus (USB), a Bluetooth® interface, a near field communication (NFC) interface, and/or a PCI express interface. In some examples, the communication interface 210 implements the means for obtaining.

In the illustrated example of FIG. 2, the cloud manager 100 includes means for determining provisioning requirements based on a blueprint. In some examples, the provisioning requirements are associated with a provisioning of a virtual resource (e.g., one(s) of the VMs 106, 110, one(s) of the containers 108, 112, a resource associated with the one(s) of the VMs 106, 110, a resource associated with one(s) of the containers 108, 112, etc.) to a cloud computing environment (e.g., one(s) of the cloud computing environments 114, 116 of FIG. 1). In this example, the means for determining is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the blueprint controller 220 implements the means for determining.

In the illustrated example of FIG. 2, the cloud manager 100 includes means for adjusting one or more first provisioning requirements to one or more second provisioning requirements. In some examples, the means for adjusting can execute the adjustment in response to a determination that the first provisioning requirements are not satisfied based on one or more visualizations (e.g., one(s) of the visualizations 102, 104 of FIG. 1, one(s) of the visualization(s) 276 of FIG. 2, one(s) of the provisioning visualizations 400, 500, 600, 700, 800, 900 of FIGS. 4-9, etc.). In some examples, the means for adjusting executes the adjustment based on a modified blueprint. In this example, the means for adjusting is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the blueprint controller 220 implements the means for adjusting.

In the illustrated example of FIG. 2, the cloud manager 100 includes means for generating a blueprint based on one or more provisioning requirements and means for storing the blueprint. In this example, the means for generating and/or the means for storing is/are implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the blueprint controller 220 implements the means for generating and/or the means for storing.

In the illustrated example of FIG. 2, the cloud manager 100 includes means for adjusting one or more first provisioning requirements associated with a non-compliant visualization layer to one or more second provisioning requirements, where the one or more second provisioning requirements can satisfy parameters associated with a visualization layer of a visualization. In this example, the means for adjusting is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the blueprint controller 220 implements the means for adjusting.

In the illustrated example of FIG. 2, the cloud manager 100 includes means for comparing provisioning requirements to parameters associated with a cloud computing environment (e.g., one(s) of the cloud computing environments 114, 116 of FIG. 1). In some examples, the means for comparing is to determine whether the provisioning requirements satisfy the parameters associated with a visualization layer of a visualization. In some examples, the means for comparing is to, in response to determining that the provisioning requirements do not satisfy the parameters associated with the visualization layer, identify the visualization layer as a non-compliant visualization layer. In some examples, the means for comparing is to identify the cloud computing environment as a non-compliant cloud computing environment based on the non-compliant visualization layer.

In some examples, the means for comparing is to determine whether first provisioning requirements satisfy parameters associated with a plurality of visualization layers of a visualization, in response to determining that the provisioning requirements satisfy the parameters associated with the plurality of the visualization layers, identify the plurality of the visualization layers as compliant visualization layers, and identify the cloud computing environment as a compliant cloud computing environment based on the plurality of the compliant visualization layers. In some examples, the visualization is a first visualization associated with a first provisioning stage of a plurality of provisioning stages, the parameters are first parameters associated with the first provisioning stage, the plurality of the provisioning stages including a second provisioning stage, and the means for comparing is to compare the first provisioning requirements to second parameters associated with a second provisioning stage.

In these examples, the means for comparing is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the requirement comparator 230 implements the means for comparing.

In the illustrated example of FIG. 2, the cloud manager 100 includes means for generating one or more visualizations (e.g., one(s) of the visualizations 102, 104 of FIG. 1, one(s) of the visualization(s) 276 of FIG. 2, one(s) of the provisioning visualizations 400, 500, 600, 700, 800, 900 of FIGS. 4-9, etc.) based on a comparison of one or more first provisioning requirements from a blueprint to parameters associated with a cloud computing environment (e.g., one(s) of the cloud computing environments 114, 116 of FIG. 1). In some examples, the one or more first provisioning requirements are associated with a provisioning of a virtual resource (e.g., one(s) of the VMs 106, 110, one(s) of the containers 108, 112, etc.) to the cloud computing environment. In some examples, the means for generating is to generate a second visualization based on one or more second provisioning requirements. In such examples, the one or more second provisioning requirements can be adjusted and/or otherwise modified from the one or more first provisioning requirements. In some examples, the second visualization can display a visualization layer of the second visualization as a compliant visualization layer and the cloud computing environment as a compliant cloud computing environment. In these examples, the means for generating is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the means for generating is implemented by one or more display devices (e.g., a light emitting diode (LED), an organic light emitting diode (OLED), a liquid crystal display (LCD), a cathode ray tube (CRT) display, an in-place switching (IPS) display, a touchscreen, etc.). In some examples, the visualization generator 250 implements the means for generating.

In the illustrated example of FIG. 2, the cloud manager 100 includes means for deploying a virtual resource (e.g., one(s) of the VMs 106, 110, one(s) of the containers 108, 112, a resource associated with the one(s) of the VMs 106, 110, a resource associated with one(s) of the containers 108, 112, etc.) to a cloud computing environment (e.g., one(s) of the cloud computing environments 114, 116) based on one or more provisioning requirements. In some examples, the means for deploying is to deploy the virtual resource based on a blueprint (e.g., the blueprint 136 of FIG. 1, the blueprint(s) 274 of FIG. 2, the blueprint 300 of FIG. 3A, the blueprint 350 of FIG. 3B, a modified blueprint, etc.). In some examples, the means for deploying is to deploy the virtual resource to the cloud computing environment in response to identifying the cloud computing environment as a compliant cloud computing environment. In these examples, the means for deploying is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the deployment controller 260 implements the means for deploying.

In the illustrated example of FIG. 2, the cloud manager 100 includes means for generating an alert to a computing device. In some examples, the means for generating the alert is in response to determining that one or more provisioning requirements are not satisfied based on one or more visualizations (e.g., one(s) of the visualizations 102, 104 of FIG. 1, one(s) of the visualization(s) 276 of FIG. 2, one(s) of the provisioning visualizations 400, 500, 600, 700, 800, 900 of FIGS. 4-9, etc.). In this example, the means for generating is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the alert generator 240 implements the means for generating.

FIG. 3A is a graphical representation of an example blueprint 300. The example blueprint 300 of FIG. 3A can correspond to the blueprint 136 of FIG. 1, the blueprint(s) 274 of FIG. 2, etc. In the example of FIG. 3A, the blueprint 300 represents a logical topology of an application to be deployed, such as one(s) of the applications 118, 120 of FIG. 1. In the example of FIG. 3A, the blueprint 300 includes an example cloud network (e.g., a cloud network graphical object) 310, an example cloud volume (e.g., a cloud storage volume graphical object) 320, and an example cloud machine (e.g., a cloud machine graphical object) 330. For example, the cloud network 310, the cloud volume 320, and the cloud machine 330 can be graphical objects, models, etc., that are representative of virtual resources to be deployed to one(s) of the cloud computing environments 114, 116 of FIG. 1.

In the example of FIG. 3A, the cloud network 310, the cloud volume 320, and the cloud machine 330 can include, correspond to, and/or otherwise be representative of a definition of policies (e.g., hardware policies, security policies, network policies, etc.) for a virtual resource. For example, the cloud network 310 can include one or more policies associated with deploying a virtual network, such as the first network 126 of FIG. 1 and/or the second network 128 of FIG. 1. In other examples, the cloud volume 320 can include one or more policies associated with deploying a virtual storage resource (e.g., a virtual storage resource of the VMs 106, 110 of FIG. 1). In yet other examples, the cloud machine 330 can include one or more policies associated with deploying a VM, such as the VMs 106, 110 of FIG. 1.

In the illustrated example of FIG. 3A, the cloud machine 330 includes an example tag constraint (e.g., a resource tag constraint, a virtual resource tag constraint, etc.) 340. For example, the tag constraint 340 can be a data structure including instructions (e.g., computer readable instructions, a script, etc.) to deploy a resource to the cloud computing environments 114, 116 (FIG. 1). In other examples, the tag constraint 340 can include, correspond to, and/or otherwise be representative of a configuration (e.g., a provisioning configuration), a requirement (e.g., a provisioning requirement), a setting (e.g., a provisioning setting, etc.), a specification (e.g., a provisioning specification), etc., and/or a combination thereof that can compared and/or matched to a cloud provider parameter, a computing cloud environment parameter, etc. For example, a cloud computing environment parameter can be "PCI" representative of one(s) of the cloud computing environments 114, 116 being peripheral connection interface (PCI) compliant and/or otherwise being capable of supporting PCI, PCI devices, etc. In such examples, the tag constraint 340 can be "PCI" and, thus, can satisfy the cloud computing environment parameter of "PCI" because the tag constraint 340 of "PCI" matches the cloud computing environment parameter of "PCI." Additionally or alternatively, the cloud network 310 and/or the cloud volume 320 may include one or more tag constraints, such as the tag constraint 340 of FIG. 3A.

FIG. 3B is a portion of an example blueprint 350, which corresponds to the blueprint 300 of FIG. 3A in human-readable form. The blueprint 350 is in human-readable text to enable the administrator 122, the developer 124, etc., of FIG. 1 to generate, edit, and/or otherwise modify the blueprint 350 with a text editor or other program of choice. The blueprint 350 of FIG. 3B includes machine components, software, networking, and properties in Yet Another Markup Language (YAML) format, YAML Ain't Markup Language, etc. Alternatively, the blueprint 350 of FIG. 3B may be in a different format. In some examples, a modification to the blueprint 300 of FIG. 3A causes a corresponding modification to the blueprint 350 of FIG. 3B. In some examples, a modification to the blueprint 350 of FIG. 3B causes a corresponding modification to the blueprint 300 of FIG. 3A.

In the illustrated example of FIG. 3B, the blueprint 350 includes example provisioning requirements 360 for deploying at least one of the cloud network 310, the cloud volume 320, or the cloud machine 330 of FIG. 3A. For example, the provisioning requirements 360 include an image of ubuntu, a configuration of medium, and a constraint based on the tag constraint 340 of FIG. 3A. In other examples, the provisioning requirements 360 include a storage capacity of 1 GB for the cloud volume 320 of FIG. 3A. In yet other examples, the provisioning requirements 360 include inter-resource dependencies, such as the cloud machine 330 of FIG. 3A being dependent upon and/or otherwise logically coupled to at least one of the cloud network 310 (e.g., as indicated by the configuration of "network: '${resource.Cloud_Network_1.id}'" or the cloud volume 320 of FIG. 3A (e.g., as indicated by the configuration of "source: '${resource.Cloud_Volume_1.id}'").

Figure 4:
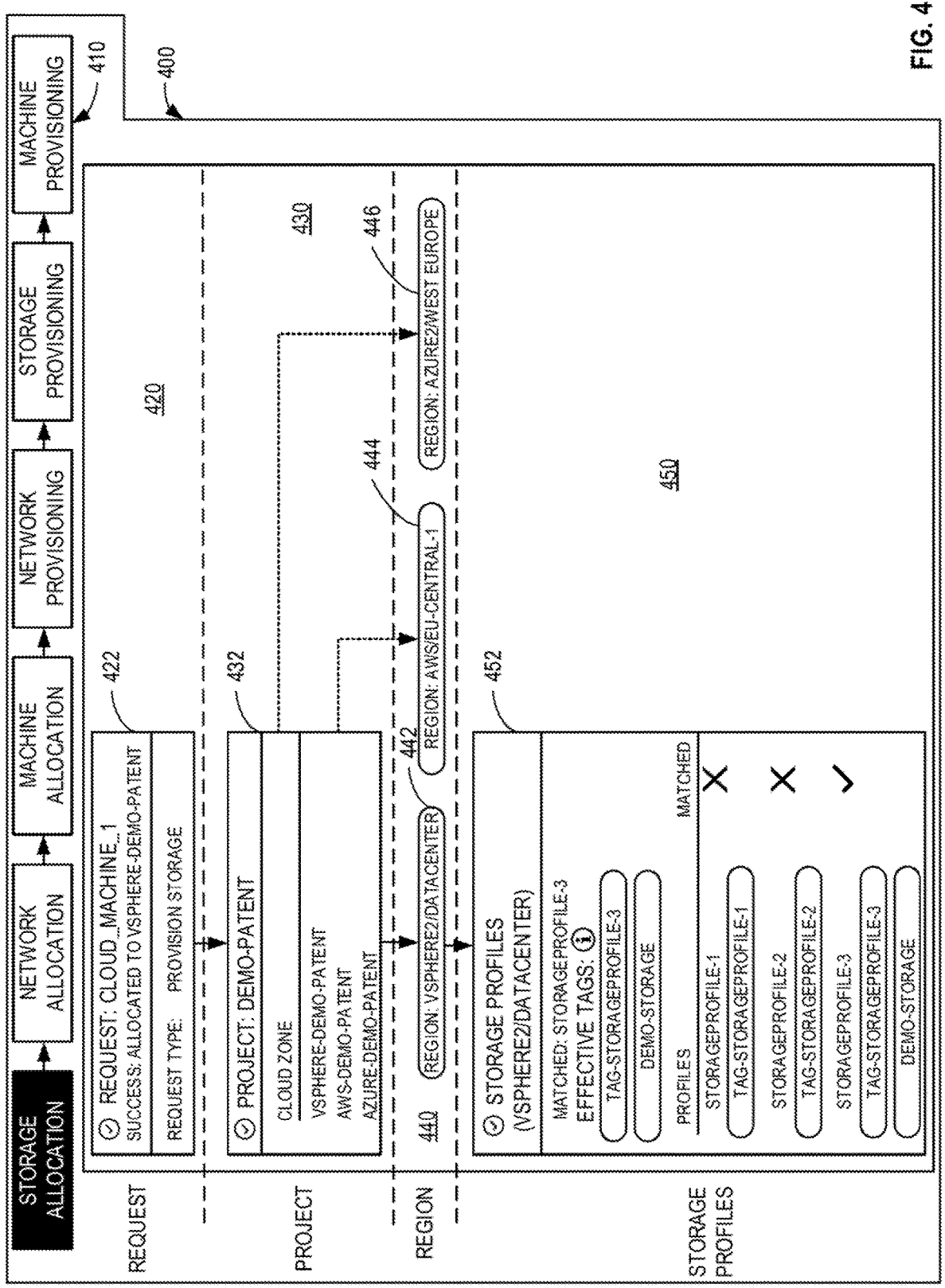
FIG. 4 is a first example virtual resource provisioning visualization associated with an example storage allocation stage of an example provisioning lifecycle.

FIG. 4 is a first example provisioning visualization (e.g., a virtual resource provisioning visualization) 400 associated with an example storage allocation stage of an example provisioning lifecycle 410. The first provisioning visualization 400 can be generated by the visualization generator 250 of FIG. 2, and/or, more generally, the cloud manager 100 of FIGS. 1 and/or 2. For example, the first provisioning visualization 400 can correspond to one(s) of the provisioning visualizations 102, 104 of FIG. 1, the visualization(s) 276 of FIG. 2, etc.

In the example of FIG. 4, the first provisioning visualization 400 can represent a workflow to determine which one(s) of the cloud computing environments 114, 116 of FIG. 1 can support allocation of a virtual storage resource as defined by the blueprint 136 of FIG. 1. In such examples, the first provisioning visualization 400 can illustrate and/or otherwise demonstrate which one(s) of the cloud computing environments 114, 116 of FIG. 1 have parameters (e.g., cloud provider parameters, cloud computing environment parameters, etc.) that can satisfy the provisioning requirements of the blueprint 136.

In the example of FIG. 4, the first provisioning visualization 400 includes the provisioning lifecycle 410 (e.g., a dashboard, a header, etc., of a user interface that includes the provisioning lifecycle 410) and example visualization layers 420, 430, 440, 450. The provisioning lifecycle 410 includes multiple stages of a workflow to provision virtual resource(s) to one(s) of the cloud computing environments 114, 116 of FIG. 1. The provisioning lifecycle 410 of the example of FIG. 4 includes the storage allocation stage, an example network allocation stage, an example machine allocation stage, an example network provisioning stage, an example storage provisioning stage, and an example machine provisioning stage. Alternatively, the provisioning lifecycle 410 may include fewer or more stages than depicted in the example of FIG. 4. Alternatively, many other methods of implementing the provisioning lifecycle 410 may alternatively be used. For example, the order of execution of the stages may be changed, and/or some of the stages described may be changed, eliminated, or combined.

In the illustrated example of FIG. 4, the first provisioning visualization 400 is a user interface (UI) (e.g., a graphical user interface (GUI), a visual user interface (VUI), etc.) that, when rendered and/or otherwise executed, can be displayed on one or more display devices associated with a computing device. For example, the first provisioning visualization 400 can be displayed on a display of a computing device operated by the administrator 122 of FIG. 1, the developer 124 of FIG. 1, etc., or any other end user.

In the example of FIG. 4, the visualization layers 420, 430, 440, 450 include a first example visualization layer 420, a second example visualization layer 430, a third example visualization layer 440, and a fourth example visualization layer 450. The visualization layers 420, 430, 440, 450 can include one or more sections (e.g., visualization sections, boxes (e.g., dialog boxes) or visualization boxes, panes or visualization panes, windows or visualization windows, partitions or visualization partitions, etc.) to display information of interest. In the example of FIG. 4, the first visualization layer 420 is a request layer that includes a first example section 422 including request information. For example, the request information can be based on the blueprint 136 of FIG. 1. In such examples, the request information can include (1) a request type of provisioning a virtual storage resource and (2) provisioning status information including whether the request can be or has been successful.

In the illustrated example of FIG. 4, the second visualization layer 430 includes a second example section 432 including project information. In the example of FIG. 4, the project information includes information regarding different cloud providers, cloud computing environments, etc., of interest to that the virtual storage resource may be allocated.

In the example of FIG. 4, the third visualization layer 440 includes region information associated with different cloud providers, cloud computing environments, etc., to which the virtual storage resource may be allocated. The third visualization layer 440 includes a third example section 442 corresponding to a first region representative of first hardware managed by a first cloud provider that is physically located in a first geographical region, a fourth example section 444 corresponding to a second region representative of second hardware managed by a second cloud provider, and a fifth example section 446 corresponding to a third region representative of third hardware managed by a third cloud provider. In such examples, the first region can be the first cloud computing environment 114 or portion(s) thereof, the second region can be the second cloud computing environment 116 or portion(s) thereof, etc.

In the illustrated example of FIG. 4, the fourth visualization layer 450 includes profile information (e.g., information associated with one(s) of the profile(s) 272 of FIG. 2). The fourth visualization layer 450 includes a sixth example section 452 that includes information regarding which one(s) of storage profile(s) match the provisioning requirements based on the blueprint 136 of FIG. 1. For example, the storage profiles can include different profiles corresponding to different configurations of hardware, software, firmware, etc., and/or a combination thereof that can be used to deploy one(s) of virtual resource(s) to one(s) of the cloud computing environments 114, 116 of FIG. 1.

In the example of FIG. 4, one of the three profiles matched the provisioning requirements of the blueprint 136. For example, the requirement comparator 230 of FIG. 2 can compare the parameters included in each of the visualization layers 420, 430, 440, 450 to corresponding one(s) of the provisioning requirements included in and/or otherwise based on the blueprint 136 of FIG. 1 or any other blueprint. In such examples, the requirement comparator 230 can determine that the profile "STORAGEPROFILE-3" satisfied the provisioning requirements as indicated by the checkmark graphic, icon, symbol, etc., while the remaining two profiles did not satisfy the provisioning requirements as indicated by the "X" graphic, icon, symbol, etc. For example, the requirement comparator 230 can determine that the remaining two profiles included provisioning requirements that do not match the corresponding parameters and, thus, the provisioning requirements do not satisfy the corresponding parameters. In other examples, the requirement comparator 230 can determine that the remaining two profiles included provisioning requirements that are more stringent, stricter, and/or are otherwise greater than the corresponding parameters and, thus, the provisioning requirements do not satisfy the corresponding parameters In some examples, a section including parameter(s) that satisfy provisioning requirement(s) are color coded to indicate such compliance, meeting, and/or otherwise satisfaction of the provisioning requirement(s). For example, the first section 422, the second section 424, the third section 442, and/or the sixth section 452 can be outlined in green or have a green border, the checkmark graphics can be green in color, etc., and/or a combination thereof. Alternatively, any other line style, weight, color, or combination of colors may be used.

In some examples, a section including parameter(s) that do not satisfy provisioning requirement(s) can be color coded to indicate such non-compliance, non-meeting, and/or otherwise non-satisfaction of the provisioning requirement(s). For example, the fourth section 444 and/or the fifth section 446 can be outlined in red or have a red border. Alternatively, any other line style, weight, color, or combination of colors may be used to indicate to a user (e.g., the administrator 122, the developer 124, etc., of FIG. 1) that such regions have parameters(s) that do not satisfy one or more provisioning requirements.

In the example of FIG. 4, the requirement comparator 230 can identify the fourth visualization layer 450 as a compliant visualization layer. For example, the requirement comparator 230 can identify and/or otherwise associated parameter(s) included in the fourth visualization layer 450 as satisfying and/or otherwise complying with provisioning requirements based on the blueprint 136 for a storage profile. In such examples, the requirement comparator 230 can identify the first region (e.g., the first cloud computing environment 114) as a compliant cloud computing environment. Alternatively, if the associated parameter(s) included in the fourth visualization layer 450 did not satisfy and/or otherwise did not comply with the provisioning requirements based on the blueprint 136 for the storage profile, the requirement comparator 230 can identify the fourth visualization layer 450 as a non-compliant visualization layer and/or, more generally, identify the first region as a non-compliant cloud computing environment. Advantageously, by exposing underlying decisions, rationales, etc., of a policy-based provisioning engine, the first provisioning visualization 400 of the example of FIG. 4 can demonstrate to a user which one(s) of available profile(s) can be used to deploy virtual resource(s) of interest and which one(s) may have errors and/or incompatible configurations.

Figure 5:
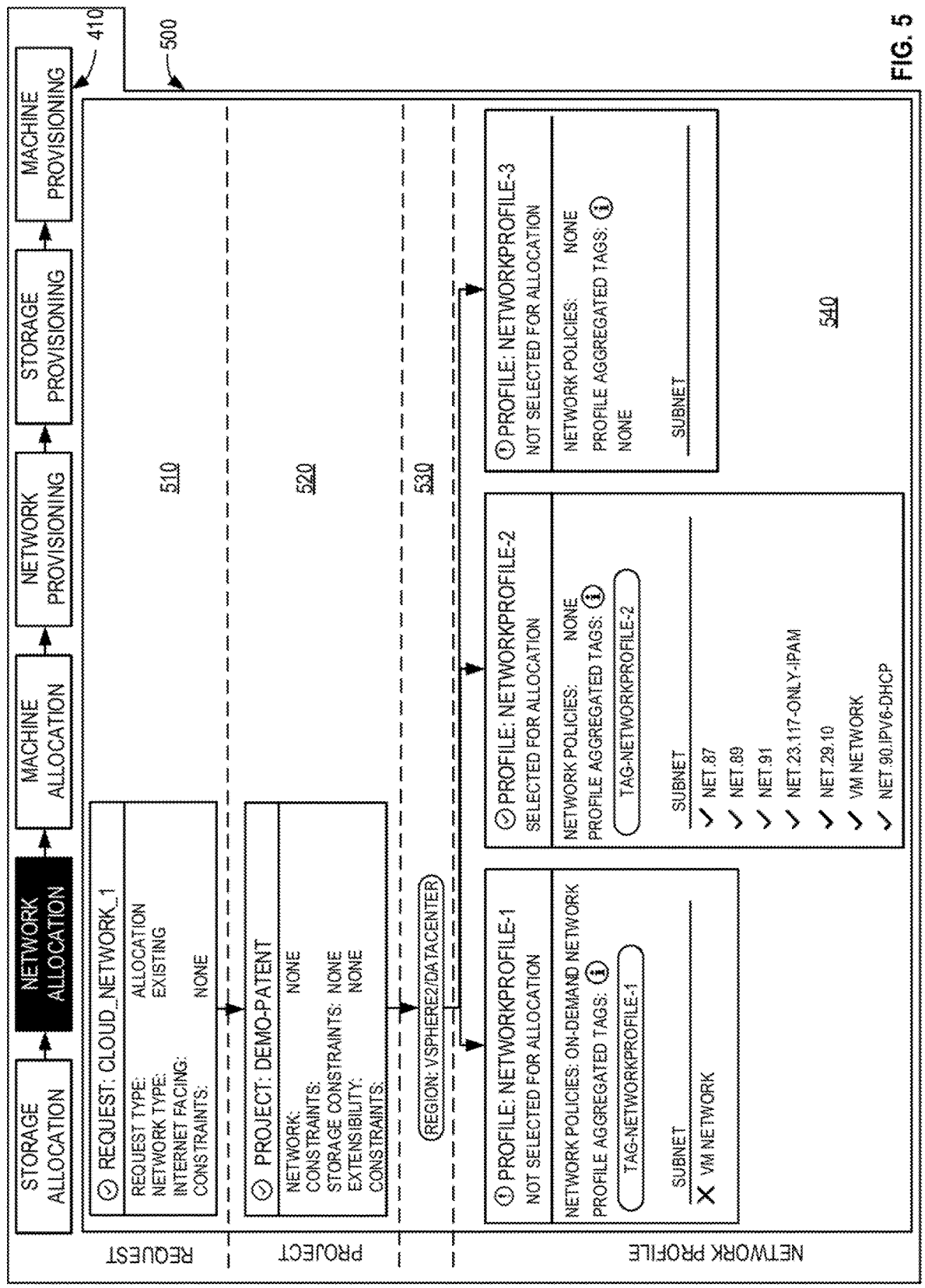
FIG. 5 is a second example virtual resource provisioning visualization associated with an example network allocation stage of the example provisioning lifecycle of FIG. 4.

FIG. 5 is a second example provisioning visualization (e.g., a virtual resource provisioning visualization) 500 associated with an example network allocation stage of the example provisioning lifecycle 410 of FIG. 4. The second provisioning visualization 500 can be generated by the visualization generator 250 of FIG. 2, and/or, more generally, the cloud manager 100 of FIGS. 1 and/or 2. For example, the second provisioning visualization 500 can correspond to one(s) of the provisioning visualizations 102, 104 of FIG. 1, the visualization(s) 276 of FIG. 2, etc.

In the example of FIG. 5, the second provisioning visualization 500 can represent a workflow to determine which one(s) of the cloud computing environments 114, 116 of FIG. 1 can support allocation of a virtual network resource as defined by the blueprint 136 of FIG. 1. In such examples, the second provisioning visualization 500 can illustrate and/or otherwise demonstrate which one(s) of the cloud computing environments 114, 116 of FIG. 1 have parameters (e.g., cloud provider parameters, cloud computing environment parameters, etc.) that can satisfy the provisioning requirements of the blueprint 136.

In the example of FIG. 5, the requirement comparator 230 of FIG. 2, and/or, more generally, the cloud manager 100 of FIGS. 1 and/or 2, can compare the parameters of the network profiles to the provisioning requirements based on the blueprint 136 of FIG. 1. For example, the requirement comparator 230 of FIG. 2 can compare the parameters included in each of example visualization layers 510, 520, 530, 540 to corresponding one(s) of the provisioning requirements based on the blueprint 136 of FIG. 1.

In the example of FIG. 5, based on the comparisons, the requirement comparator 230 can determine that the network profile "NETWORKPROFILE-2" satisfies the provisioning requirements as indicated by the checkmark icon(s). Additionally or alternatively, parameters, profiles, etc., that satisfy provisioning requirement(s) may be color coded to indicate such meeting or satisfying of requirements. For example, the profile "NETWORKPROFILE-2" can be outlined in green or have a green border, the checkmarks may be green in color, etc. Alternatively, any other color or combination of colors may be used. In other examples, the profiles "NETWORKPROFILE-1" and "NET WORKPROFILE-3" can be outlined in red or have a red border, the "X" graphics may be red in color, etc., to indicate to a user (e.g., the administrator 122, the developer 124, etc., of FIG. 1) that such profiles did not satisfy one or more provisioning requirements. Alternatively, any other color or combination of colors may be used.

Figure 6:
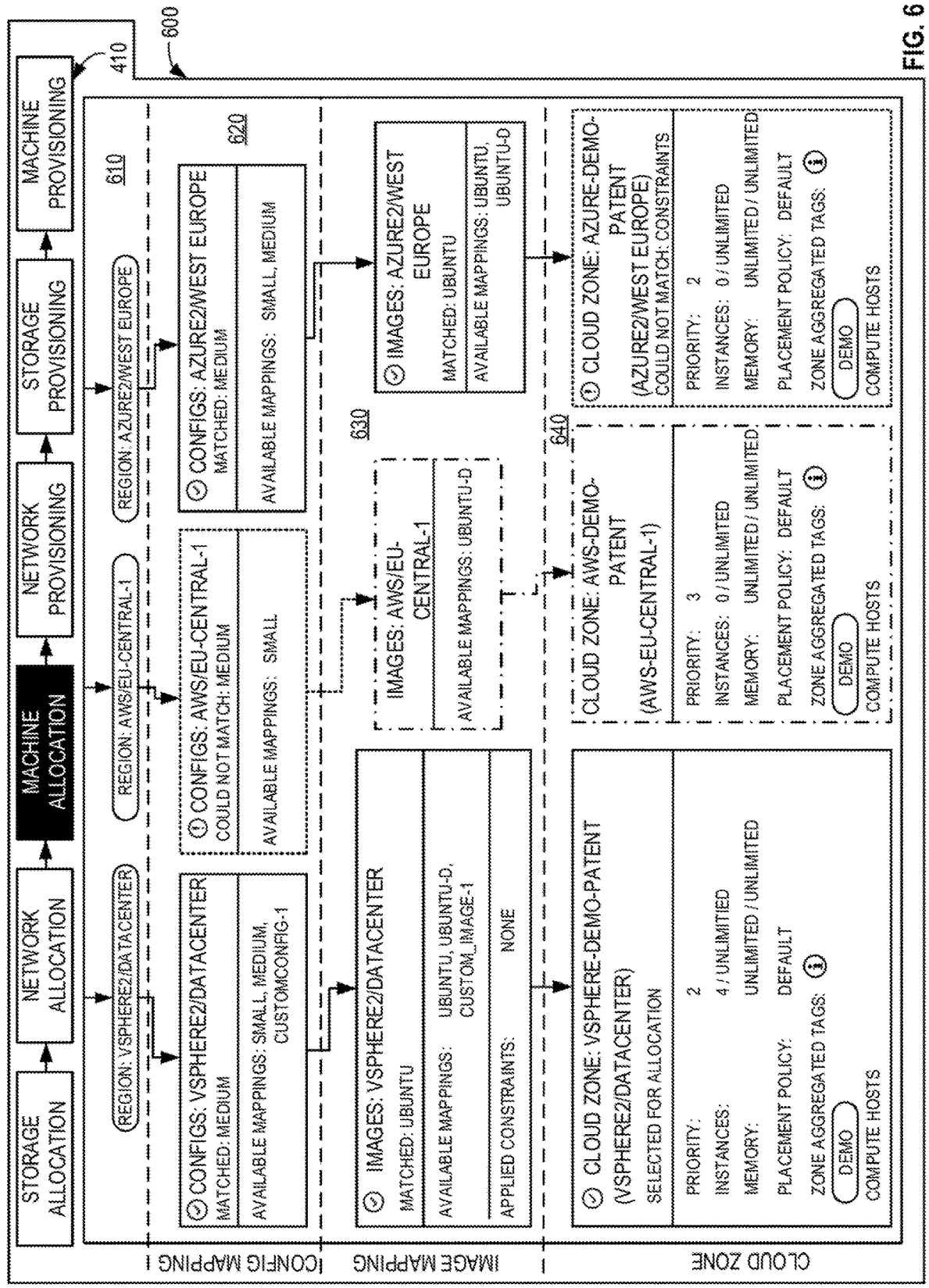
FIG. 6 is a third example virtual resource provisioning visualization associated with an example machine allocation stage of the example provisioning lifecycle of FIG. 4.

FIG. 6 is a third example provisioning visualization (e.g., a virtual resource provisioning visualization) 600 associated with an example machine allocation stage of the example provisioning lifecycle 410 of FIG. 4. The third provisioning visualization 600 can be generated by the visualization generator 250 of FIG. 2, and/or, more generally, the cloud manager 100 of FIGS. 1 and/or 2. For example, the third provisioning visualization 600 can correspond to one(s) of the provisioning visualizations 102, 104 of FIG. 1, the visualization(s) 276 of FIG. 2, etc.

In the example of FIG. 6, the third provisioning visualization 600 can represent a workflow to determine which one(s) of the cloud computing environments 114, 116 of FIG. 1 can support allocation of a VM resource as defined by the blueprint 136 of FIG. 1. In such examples, the third provisioning visualization 600 can illustrate and/or otherwise demonstrate which one(s) of the cloud computing environments 114, 116 of FIG. 1 have parameters (e.g., cloud provider parameters, cloud computing environment parameters, etc.) that can satisfy the provisioning requirements of the blueprint 136.

In the example of FIG. 6, the requirement comparator 230 of FIG. 2, and/or, more generally, the cloud manager 100 of FIGS. 1 and/or 2, can compare the parameters of different regions (e.g., one or more regions associated with the cloud computing environments 114, 116 of FIG. 1, the cloud providers, etc., and/or a combination thereof) to the provisioning requirements based on the blueprint 136 of FIG. 1. For example, the requirement comparator 230 of FIG. 2 can compare the parameters included in each of example visualization layers 610, 620, 630, 640 to corresponding one(s) of the provisioning requirements based on the blueprint 136 of FIG. 1. In the example of FIG. 6, the visualization layers 610, 620, 630, 640 include a first example visualization layer 610, a second example visualization layer 620, a third example visualization layer 630, and a fourth example visualization layer 640.

In the example of FIG. 6, based on the comparisons, the requirement comparator 230 can determine that the region "VSPHERE2/DATACENTER" satisfies the provisioning requirements as indicated by the checkmark icon(s) and/or the solid outlined boxes (e.g., the configurations (configs) box, the images box, the cloud zone box, etc.). Additionally or alternatively, parameters, profiles, etc., that satisfy provisioning requirement(s) may be color coded to indicate such meeting or satisfying of requirements. For example, the configurations, the images, and the cloud zone box of the region "VSPHERE2/DATACENTER" can be outlined in green or have a green border, the checkmarks can be green in color, etc. Alternatively, any other color or combination of colors may be used.

In other examples, parameters, boxes including parameters, etc., that do not satisfy the provisioning requirement(s) can be color coded to indicate such non-compliance or non-satisfying of requirements. For example, the configuration box of the region "AWS/EU-CENTRAL-1" and the cloud zone box of the region "AZURE2/WEST EUROPE" are dotted to indicate non-compliance of the provisioning requirement(s). In such examples, the configuration box has the parameter of "SMALL" for the configuration while the provisioning requirement is for a "MEDIUM" configuration. In the example of FIG. 6, the cloud zone box of the region "AZURE2/WEST EUROPE" is dotted because the parameters associated with the cloud zone box could not match the constraints specified by the provisioning requirements. In the example of FIG. 6, the dotted boxes can be outlined in red or have a red border (e.g., a red-dashed border), the "X" graphics may be red in color, etc., to indicate to a user (e.g., the administrator 122, the developer 124, etc., of FIG. 1) that such boxes included parameters that did not satisfy one or more provisioning requirements. Alternatively, any other color, combination of colors, shading, style of box outlines, etc., may be used.

In the example of FIG. 6, the dot-dash boxes can correspond to parameters not yet evaluated by the requirement comparator 230. For example, the requirement comparator 230 can determine not to evaluate the parameters included in the image and cloud zone box of the region "AWS/EU-CENTRAL-1" because the parameters included in the configuration box did not meet the provisioning requirements. Advantageously, the requirement comparator 230 can reduce the expenditure of unnecessary computing resources by not further evaluating parameters of a corresponding region in response to determining at least one parameter of the region that does not meet or satisfy a provisioning requirement of interest.

Figure 7:
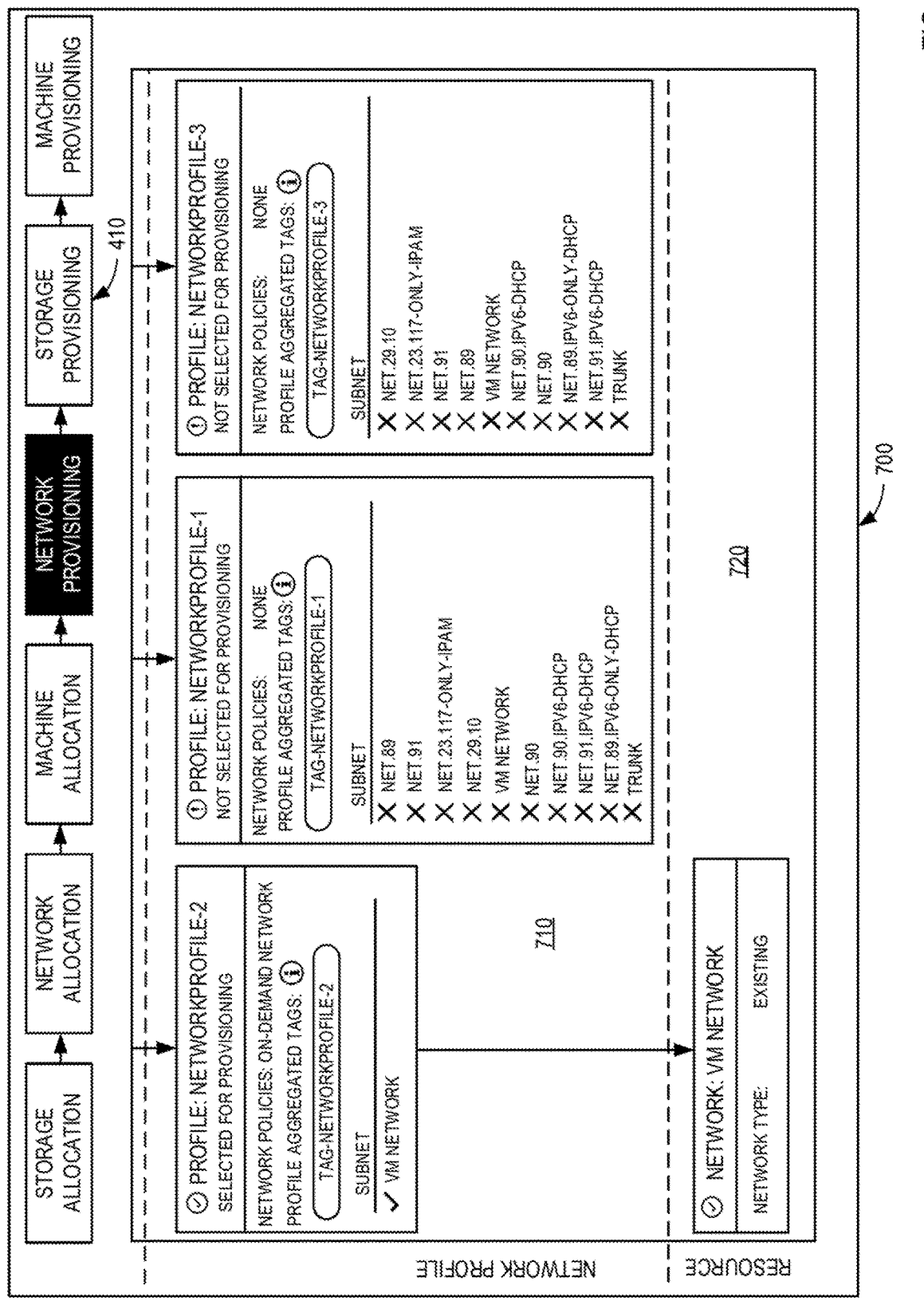
FIG. 7 is a fourth example virtual resource provisioning visualization associated with an example network provisioning stage of the example provisioning lifecycle of FIG. 4.

FIG. 7 is a fourth example provisioning visualization (e.g., a virtual resource provisioning visualization) 700 associated with an example network provisioning stage of the example provisioning lifecycle 410 of FIG. 4. The fourth provisioning visualization 700 can be generated by the visualization generator 250 of FIG. 2, and/or, more generally, the cloud manager 100 of FIGS. 1 and/or 2. For example, the fourth provisioning visualization 700 can correspond to one(s) of the provisioning visualizations 102, 104 of FIG. 1, the visualization(s) 276 of FIG. 2, etc.

In the example of FIG. 7, the fourth provisioning visualization 700 can represent a workflow to determine which one(s) of the cloud computing environments 114, 116 of FIG. 1 can support provisioning of a virtual network resource as defined by the blueprint 136 of FIG. 1. In such examples, the fourth provisioning visualization 700 can illustrate and/or otherwise demonstrate which one(s) of the cloud computing environments 114, 116 of FIG. 1 have parameters (e.g., cloud provider parameters, cloud computing environment parameters, etc.) that can satisfy the provisioning requirements of the blueprint 136.

In the example of FIG. 7, the requirement comparator 230 of FIG. 2, and/or, more generally, the cloud manager 100 of FIGS. 1 and/or 2, can compare the parameters of the network profiles to the provisioning requirements based on the blueprint 136 of FIG. 1. For example, the requirement comparator 230 of FIG. 2 can compare the parameters included in each of example visualization layers 710, 720 to corresponding one(s) of the provisioning requirements based on the blueprint 136 of FIG. 1.

In the example of FIG. 7, based on the comparisons, the requirement comparator 230 can determine that the network profile "NETWORKPROFILE-2" satisfies the provisioning requirements as indicated by the checkmark icon(s). Additionally or alternatively, parameters, profiles, etc., that satisfy provisioning requirement(s) may be color coded to indicate such meeting or satisfying of requirements. For example, the profile "NETWORKPROFILE-2" can be outlined in green or have a green border, the checkmarks may be green in color, etc. Alternatively, any other color or combination of colors may be used. In other examples, the profiles "NETWORKPROFILE-1" and "NET WORKPROFILE-3" can be outlined in red or have a red border, the "X" graphics may be red in color, etc., to indicate to a user (e.g., the administrator 122, the developer 124, etc., of FIG. 1) that such profiles did not satisfy one or more provisioning requirements. Alternatively, any other color or combination of colors may be used.

Figure 8:
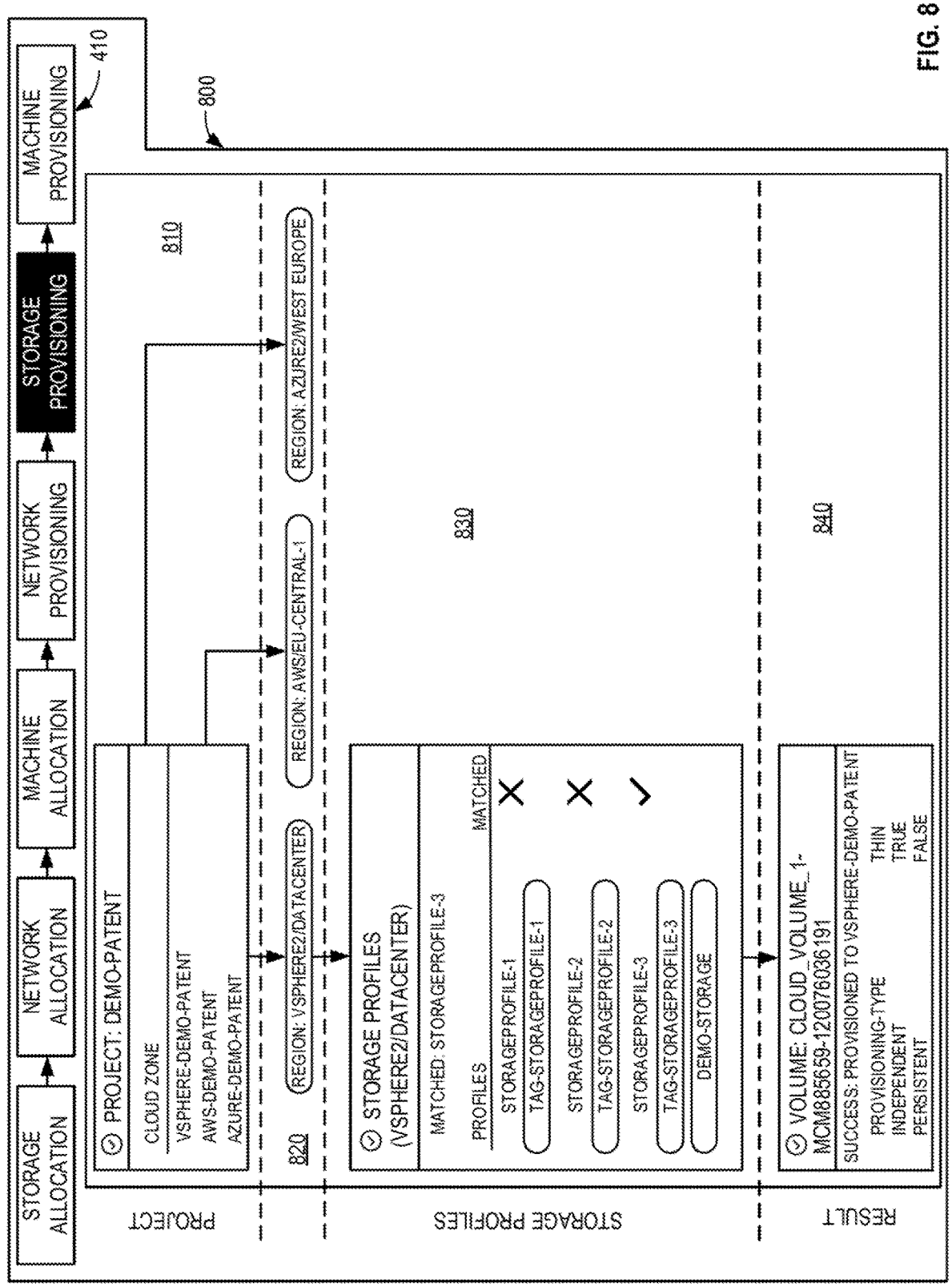
FIG. 8 is a fifth example virtual resource provisioning visualization associated with an example storage provisioning stage of the example provisioning lifecycle of FIG. 4.

FIG. 8 is a fifth example provisioning visualization (e.g., a virtual resource provisioning visualization) 800 associated with an example storage provisioning stage of the example provisioning lifecycle 410 of FIG. 4. The fifth provisioning visualization 800 can be generated by the visualization generator 250 of FIG. 2, and/or, more generally, the cloud manager 100 of FIGS. 1 and/or 2. For example, the fifth provisioning visualization 800 can correspond to one(s) of the provisioning visualizations 102, 104 of FIG. 1, the visualization(s) 276 of FIG. 2, etc.

In the example of FIG. 8, the fifth provisioning visualization 800 can represent a workflow to determine which one(s) of the cloud computing environments 114, 116 of FIG. 1 can support provisioning of a virtual storage resource as defined by the blueprint 136 of FIG. 1. In such examples, the fifth provisioning visualization 800 can illustrate and/or otherwise demonstrate which one(s) of the cloud computing environments 114, 116 of FIG. 1 have parameters (e.g., cloud provider parameters, cloud computing environment parameters, etc.) that can satisfy the provisioning requirements of the blueprint 136.

In the example of FIG. 8, one of the three profiles matched the provisioning requirements of the blueprint 136. For example, the requirement comparator 230 of FIG. 2 can compare the parameters included in each of example visualization layers 810, 820, 830, 840 to corresponding one(s) of the provisioning requirements based on the blueprint 136 of FIG. 1. In such examples, the requirement comparator 230 can determine that the profile "STORAGEPROFILE-3" satisfied the provisioning requirements as indicated by the checkmark graphic, while the remaining two profiles did not satisfy the provisioning requirements as indicated by the "X" graphic. Advantageously, by exposing underlying decisions, rationales, etc., of a policy-based provisioning engine, the fifth provisioning visualization 800 of the example of FIG. 8 can demonstrate to a user which one(s) of available profile(s) can be used to deploy virtual resource(s) of interest and which one(s) may have errors and/or incompatible configurations.

Figure 9:
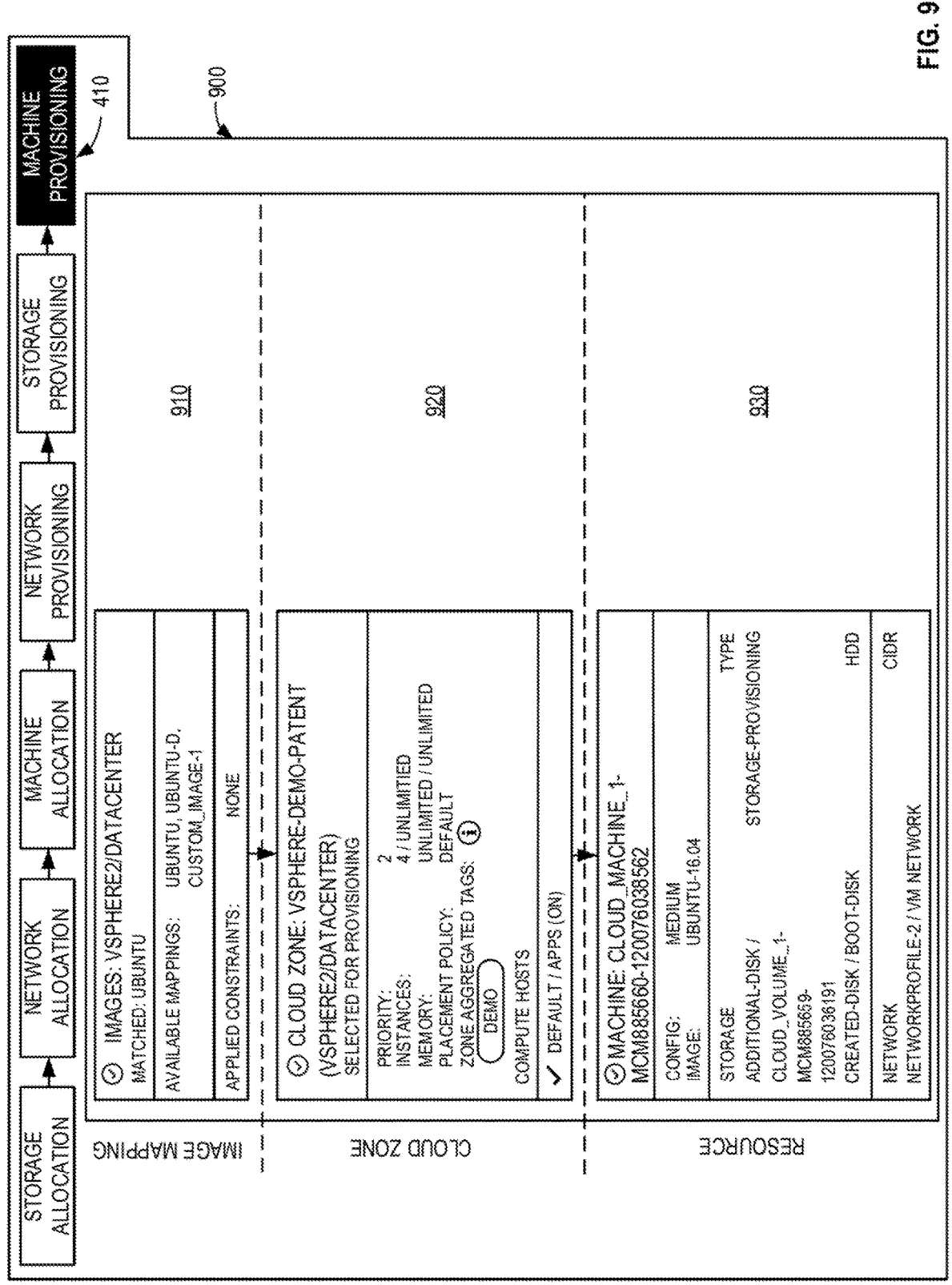
FIG. 9 is a sixth example virtual resource provisioning visualization associated with an example machine provisioning stage of the example provisioning lifecycle of FIG. 4.

FIG. 9 is a sixth example provisioning visualization (e.g., a virtual resource provisioning visualization) 900 associated with an example machine provisioning stage of the example provisioning lifecycle 410 of FIG. 4. The sixth provisioning visualization 900 can be generated by the visualization generator 250 of FIG. 2, and/or, more generally, the cloud manager 100 of FIGS. 1 and/or 2. For example, the sixth provisioning visualization 900 can correspond to one(s) of the provisioning visualizations 102, 104 of FIG. 1, the visualization(s) 276 of FIG. 2, etc.

In the example of FIG. 9, the sixth provisioning visualization 900 can represent a workflow to determine which one(s) of the cloud computing environments 114, 116 of FIG. 1 can support provisioning of a VM resource as defined by the blueprint 136 of FIG. 1. In such examples, the sixth provisioning visualization 900 can illustrate and/or otherwise demonstrate which one(s) of the cloud computing environments 114, 116 of FIG. 1 have parameters (e.g., cloud provider parameters, cloud computing environment parameters, etc.) that can satisfy the provisioning requirements of the blueprint 136.

In the example of FIG. 9, the requirement comparator 230 of FIG. 2, and/or, more generally, the cloud manager 100 of FIGS. 1 and/or 2, can compare the parameters of the image, cloud zone, and resource of a VM to be provisioned to the provisioning requirements based on the blueprint 136 of FIG. 1. For example, the requirement comparator 230 of FIG. 2 can compare the parameters included in each of example visualization layers 910, 920, 930 to corresponding one(s) of the provisioning requirements based on the blueprint 136 of FIG. 1.

Flowcharts representative of example hardware logic, machine readable instructions, hardware implemented state machines, and/or any combination thereof for implementing the cloud manager 100 of FIGS. 1 and/or 2 is shown in FIGS. 10-13. The machine readable instructions may be one or more executable programs or portion(s) of an executable program for execution by a computer processor such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 10-13, many other methods of implementing the example cloud manager 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 10-13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 10:
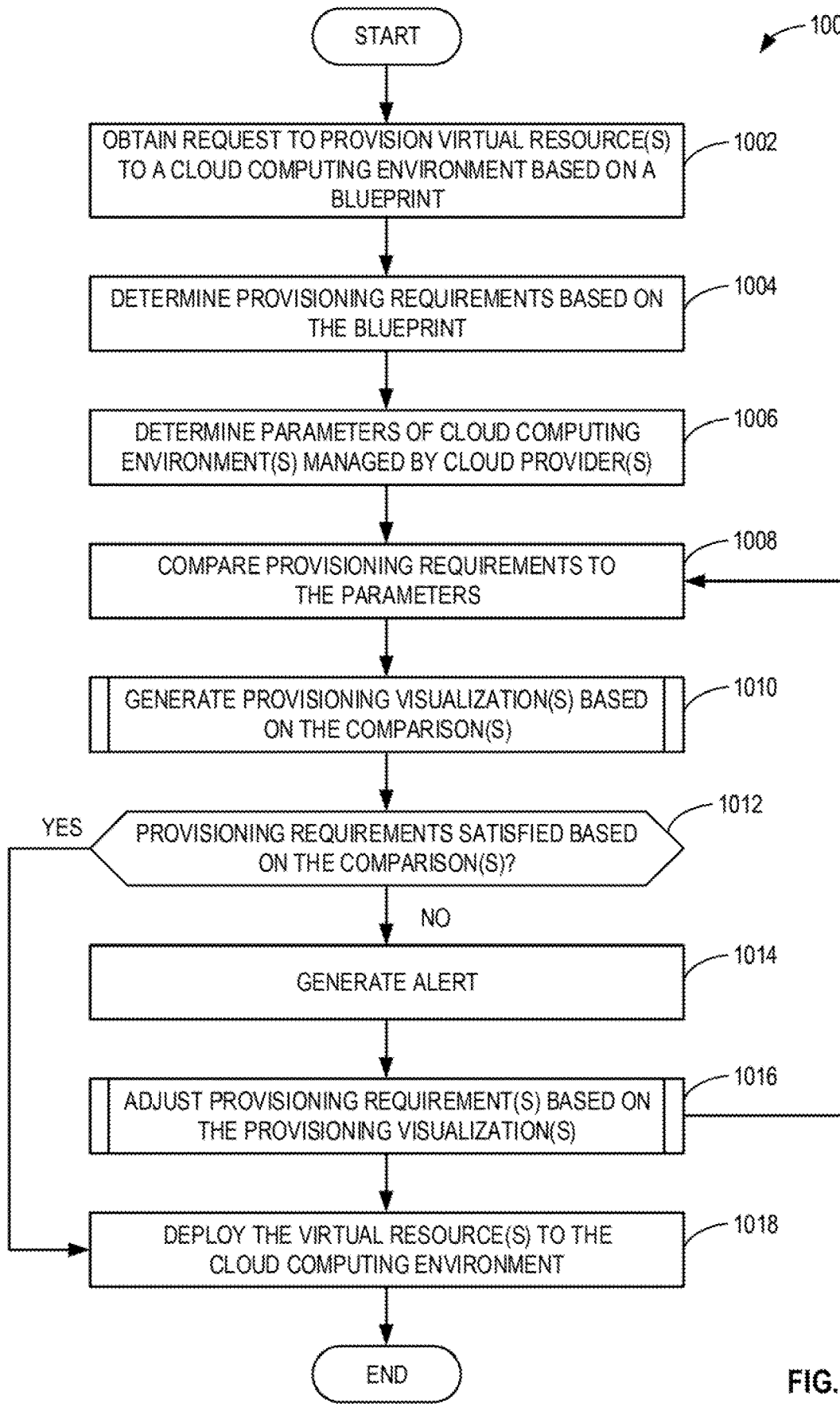
FIG. 10 is a flowchart representative of example machine readable instructions that may be executed to implement the example cloud manager of FIGS. 1 and/or 2 to deploy virtual resource(s) to the example cloud computing environment of FIG. 1.

FIG. 10 is a flowchart representative of example machine readable instructions 1000 that may be executed to implement the example cloud manager 100 of FIGS. 1 and/or 2 to deploy virtual resource(s) to one(s) of the example cloud computing environments 114, 116 of FIG. 1. The example machine readable instructions 1000 begin at block 1002, at which the cloud manager 100 obtains a request to provision virtual resource(s) to a cloud computing environment based on a blueprint. For example, the communication interface 210 (FIG. 2) can obtain a request from the administrator 122, the developer 124, etc., of FIG. 1 to provision a VM, a container, or any other virtual resource to one(s) of the cloud computing environments 114, 116 of FIG. 1. In such examples, the communication interface 210 can obtain the blueprint 136 as the request, included in the request, or in association with the request.

At block 1004, the example cloud manager 100 determines provisioning requirements based on the blueprint. For example, the blueprint controller 220 (FIG. 2) can extract one or more provisioning requirements from the blueprint 136 of FIG. 1, the blueprint(s) 274 of FIG. 2, the blueprint 300 of FIG. 3A, the blueprint 350 of FIG. 3B, etc.

At block 1006, the example cloud manager 100 determines parameters of cloud computing environment(s) managed by cloud provider(s). For example, the blueprint controller 220 can obtain parameters, such as cloud provider parameters, cloud computing environment parameters, etc., from one(s) of the endpoints 125, 127. In such examples, the blueprint controller 220 can obtain first parameters from the first endpoint(s) 125 and second parameters from the second endpoint(s) 127. In some such examples, the first parameters are associated with the first cloud computing environment 114 hosted by Cloud Provider A and the second parameters are associated with the second cloud computing environment 116 hosted by Cloud Provider B.

At block 1008, the example cloud manager 100 compares provisioning requirements to the parameters. For example, the requirement comparator 230 (FIG. 2) can compare one(s) of the provisioning requirements based on the blueprint 136 to one(s) of the parameters obtained from one(s) of the endpoints 125, 127.

At block 1010, the example cloud manager 100 generates provisioning visualization(s) based on the comparison(s). For example, the visualization generator 250 (FIG. 2) can generate a provisioning visualization for one or more stages of the provisioning lifecycle 410 of FIG. 4. In such examples, the visualization generator 250 can generate the provisioning visualizations 102, 104 of FIG. 1, one(s) of the provisioning visualizations 400, 500, 600, 700, 800, 900 of FIGS. 4, 5, 6, 7, 8, and/or 9, etc. Example instructions that may be executed to implement block 1010 are described below in connection with FIGS. 11 and/or 12.

At block 1012, the example cloud manager 100 determines whether the provisioning requirements are satisfied based on the comparison(s). For example, the requirement comparator 230 can determine whether parameters included in each of the visualization layers 420, 430, 440, 450 of the example of FIG. 4 satisfy corresponding one(s) of the provisioning requirements based on the blueprint 136 of FIG. 1.

If, at block 1012, the example cloud manager 100 determines that the provisioning requirements are not satisfied based on the comparison(s), then, at block 1014, the cloud manager 100 generates an alert. For example, the alert generator 240 (FIG. 4) can generate an alert indicating that one or more of the parameters do not satisfy corresponding one(s) of the provisioning requirements.

At block 1016, the example cloud manager 100 adjusts provisioning requirement(s) based on the provisioning visualization(s). For example, in response to the generation of the provisioning visualizations 102, 104 of FIG. 1, the administrator 122, the developer 124, etc., can determine which one(s) of the provisioning requirements to adjust based on the provisioning visualizations 102, 104. Example instructions that may be executed to implement block 1016 are described below in connection with FIG. 13. In response to adjusting the provisioning requirement(s) based on the provisioning visualization(s) at block 1016, control returns to block 1008 to compare the provisioning requirements (e.g., the adjusted provisioning requirements) to the parameters.

If, at block 1012, the example cloud manager 100 determines that the provisioning requirements are satisfied based on the comparison(s), or after the cloud manager 100 adjusts provisioning requirement(s) based on the provisioning visualization(s) at block 1016, control proceeds to block 1018 to deploy the virtual resource(s) to the cloud computing environment. For example, the deployment controller 260 (FIG. 2) can invoke the first cloud computing environment 114 of FIG. 1 to deploy one or more of the requested virtual resources. In response to deploying the virtual resource(s) to the cloud computing environment, the machine readable instructions 1000 of FIG. 10 conclude.

Figure 11:
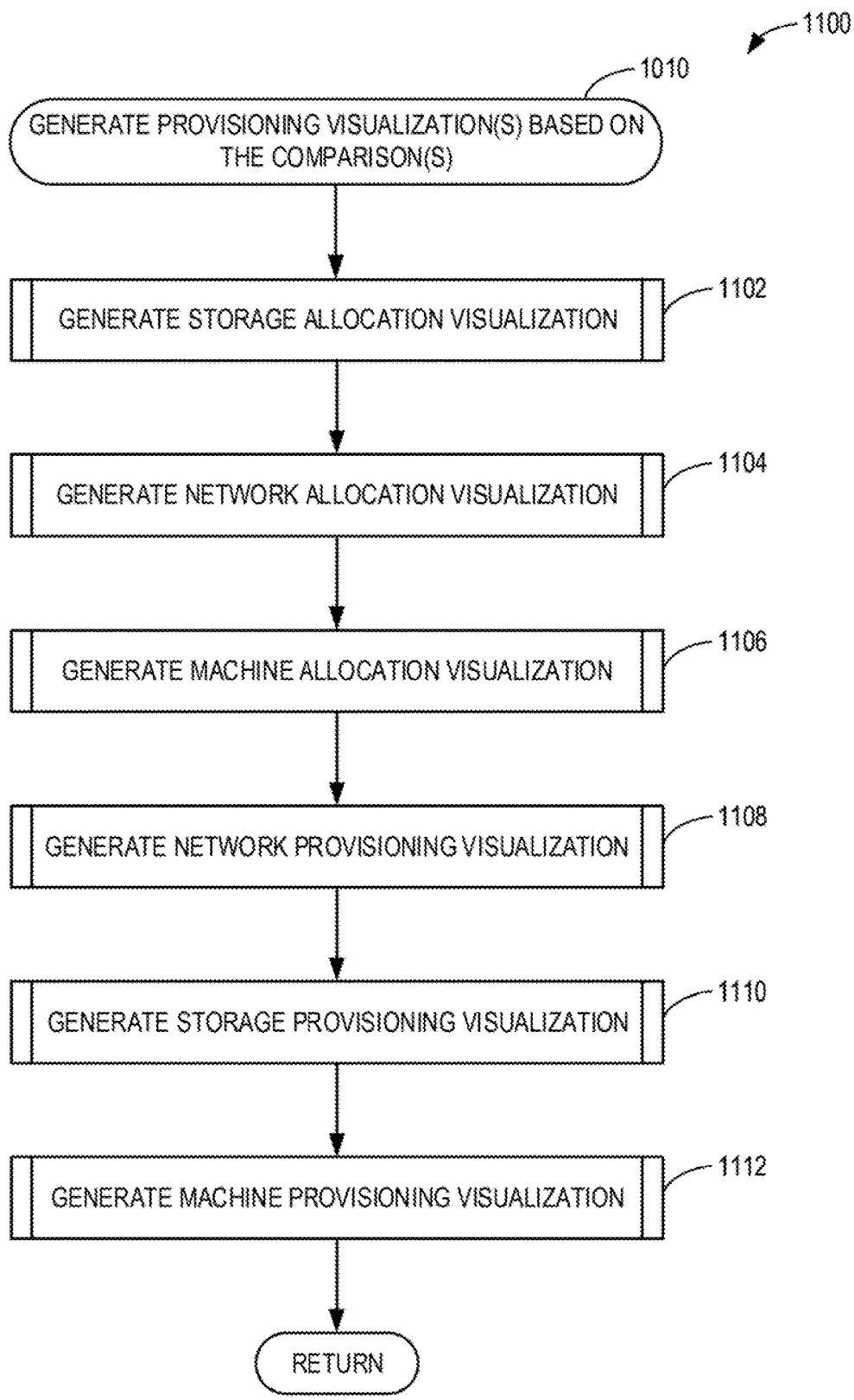
FIG. 11 is a flowchart representative of example machine readable instructions that may be executed to implement the example cloud manager of FIGS. 1 and/or 2 to generate example provisioning visualization(s).

FIG. 11 is a flowchart representative of example machine readable instructions 1100 that may be executed to implement the example cloud manager 100 of FIGS. 1 and/or 2 to generate example provisioning visualization(s). The example machine readable instructions 1100 of FIG. 11 can be executed to implement block 1010 of FIG. 10. The example machine readable instructions 1100 of FIG. 11 begin at block 1102, at which the cloud manager 100 generates a storage allocation visualization. For example, the visualization generator 250 (FIG. 2) can generate the first provisioning visualization 400 of FIG. 4. Example instructions that may be executed to implement block 1102 are described below in connection with FIG. 12.

At block 1104, the example cloud manager 100 generates a network allocation visualization. For example, the visualization generator 250 (FIG. 2) can generate the second provisioning visualization 500 of FIG. 5. Example instructions that may be executed to implement block 1104 are described below in connection with FIG. 12.

At block 1106, the example cloud manager 100 generates a machine allocation visualization. For example, the visualization generator 250 (FIG. 2) can generate the third provisioning visualization 600 of FIG. 6. Example instructions that may be executed to implement block 1106 are described below in connection with FIG. 12.

At block 1108, the example cloud manager 100 generates a network provisioning visualization. For example, the visualization generator 250 (FIG. 2) can generate the fourth provisioning visualization 700 of FIG. 7. Example instructions that may be executed to implement block 1108 are described below in connection with FIG. 12.

At block 1110, the example cloud manager 100 generates a storage provisioning visualization. For example, the visualization generator 250 (FIG. 2) can generate the fifth provisioning visualization 800 of FIG. 8. Example instructions that may be executed to implement block 1110 are described below in connection with FIG. 12.

At block 1112, the example cloud manager 100 generates a machine provisioning visualization. For example, the visualization generator 250 (FIG. 2) can generate the sixth provisioning visualization 900 of FIG. 9. Example instructions that may be executed to implement block 1112 are described below in connection with FIG. 12. In response to generating the machine provisioning visualization at block 1112, control returns to block 1012 of the example machine readable instructions 1000 of the example of FIG. 10 to determine whether the provisioning requirements are satisfied based on the comparison(s).

Figure 12:
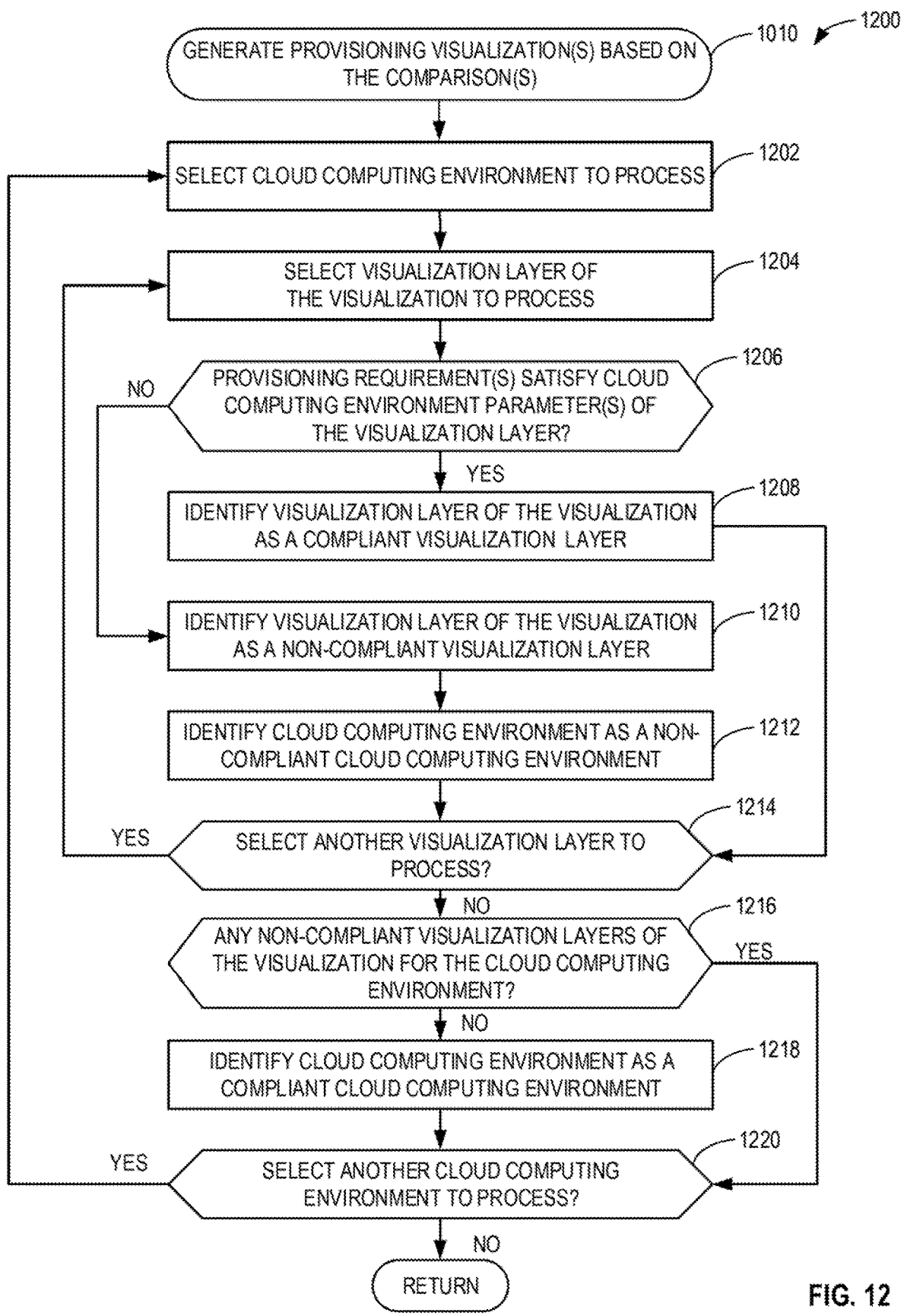
FIG. 12 is another flowchart representative of example machine readable instructions that may be executed to implement the example cloud manager of FIGS. 1 and/or 2 to generate example provisioning visualization(s).

FIG. 12 is another flowchart representative of example machine readable instructions 1200 that may be executed to implement the example cloud manager 100 of FIGS. 1 and/or 2 to generate example provisioning visualization(s). The example machine readable instructions 1200 of FIG. 12 can be executed to implement block 1010 of FIG. 10. The example machine readable instructions 1200 of FIG. 12 can be executed to implement at least one of blocks 1102, 1104, 1106, 1108, 1110, or 1112 of FIG. 11. The example machine readable instructions 1200 of FIG. 12 begin at block 1202, at which the cloud manager 100 selects a cloud computing environment to process. For example, the requirement comparator 230 (FIG. 2) can select the first cloud computing environment 114 (FIG. 1) hosted by Cloud Provider A to process. In such examples, the requirement comparator 230 can select the region "VSPHERE2/DATACENTER" of FIG. 6 to process.

At block 1204, the example cloud manager 100 selects a visualization layer of the visualization to process. For example, the requirement comparator 230 can select the second visualization layer 620 of FIG. 6 to process. In such examples, the second visualization layer 620 corresponds to the configuration mapping visualization layer. The configuration mapping visualization layer of FIG. 6 includes example sections (e.g., a first section "VSPHERE2/DATACENTER", a second section "AWS/EU-CENTRAL-1", etc.) that each include example cloud computing environment parameters associated with the different configurations that the respective regions support.

At block 1206, the example cloud manager 100 determines whether the provisioning requirement(s) satisfy the cloud computing environment parameter(s) of the visualization layer. For example, the requirement comparator 230 can determine whether provisioning requirements included in the blueprint 136 of FIG. 1 satisfy the cloud computing environment parameters included in the section "VSPHERE2/DATACENTER". In such examples, the requirement comparator 230 can determine that one of the available configuration mappings included in the section is "MEDIUM," which matches the configuration mapping "MEDIUM" included in the blueprint 136. Accordingly, the requirement comparator 230 can determine that the provisioning requirement (e.g., a configuration mapping of "MEDIUM") satisfies the cloud computing environment parameter ("e.g., configuration mappings including "SMALL," "MEDIUM," "CUSTOMCONFIG-1," etc.) based on the comparison.

If, at block 1206, the example cloud manager 100 determines that the provisioning requirement(s) satisfy the cloud computing environment parameter(s) of the visualization layer, then, at block 1208, the cloud manager 100 identifies the visualization layer of the visualization as a compliant visualization layer. For example, the requirement comparator 230 can identify the second visualization layer 620 of the third provisioning visualization 600 of FIG. 6 as a compliant visualization layer for the selected cloud computing environment (e.g., the first cloud computing environment 114, the region "VSPHERE2/DATACENTER," etc.). In such examples, the visualization generator 250 (FIG. 2) can generate and/or otherwise cause the section "VSPHERE2/DATACENTER" of the second visualization layer 620 to be displayed as a compliant section, and/or, more generally, a compliant visualization layer. For example, the visualization generator 250 can display the section as having a green-colored border, a solid-line border, a checkmark graphic or icon, etc., and/or a combination thereof. In response to identifying the visualization layer of the visualization as a compliant visualization layer at block 1208, control proceeds to block 1214 to determine whether to select another visualization layer to process.

If, at block 1206, the example cloud manager 100 determines that the provisioning requirement(s) do not satisfy the cloud computing environment parameter(s) of the visualization layer, control proceeds to block 1210 to identify the visualization layer of the visualization as a non-compliant visualization layer. For example, the requirement comparator 230 can identify the second visualization layer 620 of the third provisioning visualization 600 of FIG. 6 as a non-compliant visualization layer for the selected cloud computing environment (e.g., the second cloud computing environment 116, the region "AWS/EU-CENTRAL-1," etc.). In such examples, the visualization generator 250 can generate and/or otherwise cause the section "AWS/EU-CENTRAL-1" of the second visualization layer 620 to be displayed as a non-compliant section, and/or, more generally, a non-compliant visualization layer. For example, the visualization generator 250 can display the section as having a red-colored border, a dotted-line border (e.g., a non-solid line border), an encircled exclamation graphic or icon, etc., and/or a combination thereof.

In response to identifying the visualization layer of the visualization as a non-compliant visualization layer at block 1210, control proceeds to block 1212 to identify the cloud computing environment as a non-compliant cloud computing environment. For example, the requirement comparator 230 can identify the first cloud computing environment 114, the region "VSPHERE2/DATACENTER" as a non-compliant cloud computing environment because one or more provisioning requirements based on a blueprint, such as the blueprint 136 of FIG. 1, do not satisfy one or more of the cloud computing environment parameters of the cloud computing environment being processed and/or otherwise analyzed for virtual resource provisioning.

At block 1214, the example cloud manager 100 determines whether to select another visualization layer to process. For example, the requirement comparator 230 can select the third visualization layer 630 of FIG. 6 to process. If, at block 1214, the cloud manager 100 determines to select another visualization layer to process, control returns to block 1204 to select another visualization layer of the visualization to process.

If, at block 1214, the example cloud manager 100 determines not to select another visualization layer to process, then, at block 1216, the cloud manager determines whether there are any non-compliant visualization layers of the visualization for the cloud computing environment. For example, the requirement comparator 230 can determine that none of the visualization layers 610, 620, 630, 640 of the third provisioning visualization 600 of FIG. 6 for the region "VSPHERE2/DATACENTER" are non-compliant visualization layers. In such examples, the requirement comparator 230 can identify and/or otherwise associate the region "VSPHERE2/DATACENTER" as a compliant cloud computing environment. In other examples, the requirement comparator 230 can determine that at least one of the visualization layers 610, 620, 630, 640 of the third provisioning visualization 600 of FIG. 6 for the region "AWS/EU-CENTRAL-1" are non-compliant visualization layers. In such examples, the requirement comparator 230 can identify and/or otherwise associate the region "AWS/EU-CENTRAL-1" as a non-compliant cloud computing environment.

If, at block 1216, the example cloud manager 100 determines that there is at least one non-compliant visualization layer of the visualization for the cloud computing environment, control proceeds to block 1220 to determine whether to select another cloud computing environment to process. If, at block 1216, the example cloud manager 100 determines that there are not any non-compliant visualization layers of the visualization for the cloud computing environment, then, at block 1218, the cloud manager 100 to determine whether to select another cloud computing environment to process. For example, the requirement comparator 230 can select the region "AWS/EU-CENTRAL-1" of the example of FIG. 6 (e.g., the second cloud computing environment 116 of FIG. 1) to process.

If, at block 1220, the example cloud manager 100 determines to select another cloud computing environment to process, control returns to block 1202 to select another cloud computing environment to process. If, at block 1220, the example cloud manager 100 determines not to select another cloud computing environment to process, control returns to block 1012 of the example of FIG. 10 to determine whether the provisioning requirements are satisfied based on the comparison(s). In some examples, if, at block 1220, the cloud manager 100 determines not to select another cloud computing environment to process, control returns to an invoking block of the example of FIG. 11. For example, control can return to block 1102, 1104, 1106, 1108, 1110, or 1112 of the example of FIG. 11 to generate another visualization.

Figure 13:
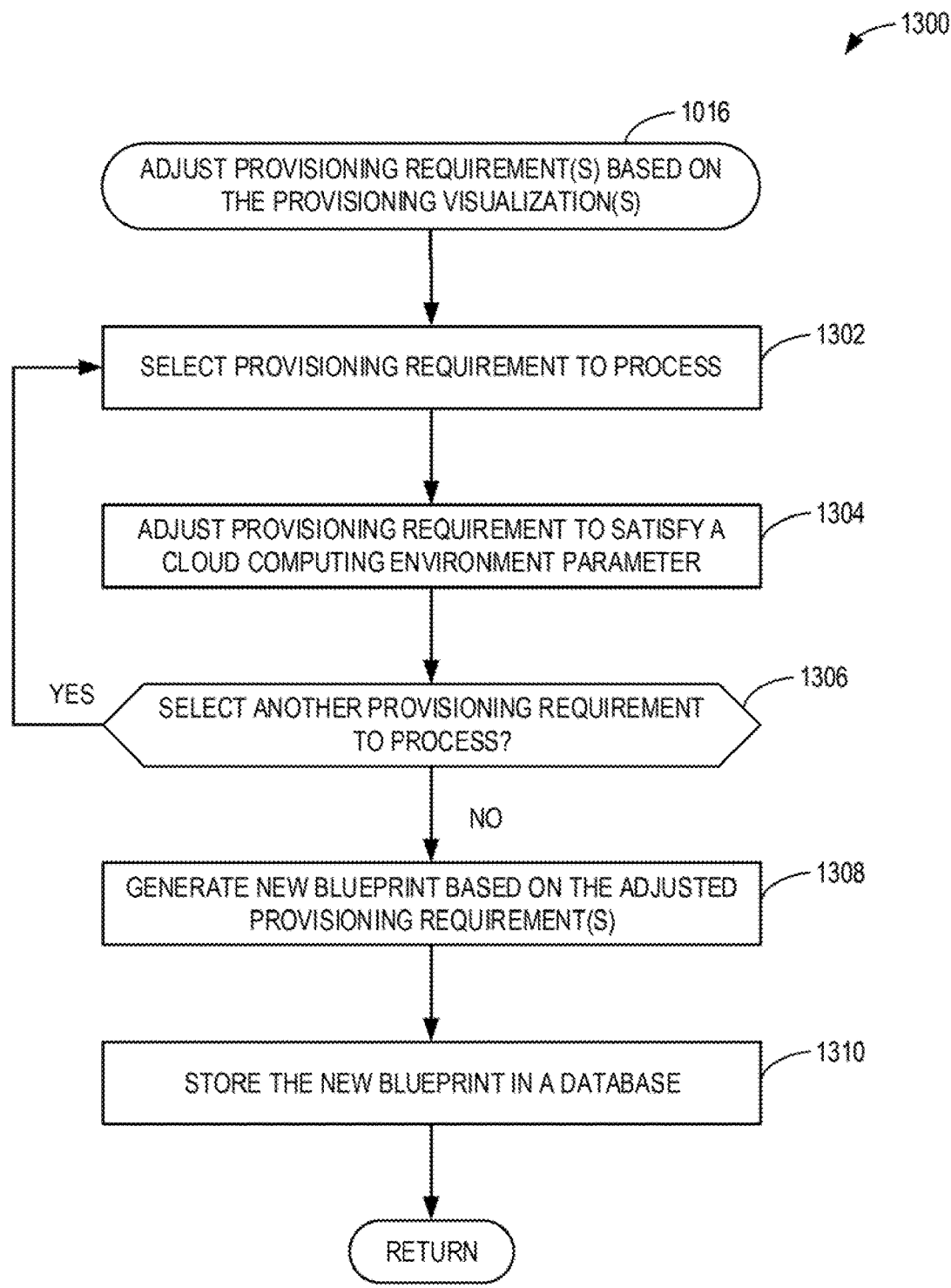
FIG. 13 is a flowchart representative of example machine readable instructions that may be executed to implement the example cloud manager of FIGS. 1 and/or 2 to adjust provisioning requirement(s) based on example provisioning visualizations.

FIG. 13 is a flowchart representative of example machine readable instructions 1300 that may be executed to implement the example cloud manager 100 of FIGS. 1 and/or 2 to adjust provisioning requirement(s) based on example provisioning visualizations. The example machine readable instructions 1300 of FIG. 13 can be executed to implement block 1016 of FIG. 10. The example machine readable instructions 1300 of FIG. 13 begin at block 1302, at which the cloud manager 100 selects a provisioning requirement to process. For example, the blueprint controller 220 (FIG. 2) can select one of the provisioning requirements 360 included in the blueprint 350 of FIG. 3B. In such examples, the blueprint controller 220 can select the image provisioning requirement that has a value of "ubuntu" to process.

At block 1304, the example cloud manager 100 adjusts the provisioning requirement to satisfy a cloud computing environment parameter. For example, the requirement comparator 230 (FIG. 2) can determine that a cloud computing environment parameter for an image (e.g., a machine image) of one(s) of the first VMs 106 of FIG. 1 has a value of "ubuntu-d" based on the third visualization layer 630 of FIG. 6 that corresponds to image mapping. In such examples, the requirement comparator 230 can determine that the cloud computing environment parameter included in the section "AWS/EU-CENTRAL-1" for the region "AWS/EU-CENTRAL-1" has a value of "ubuntu-d". In such examples, the blueprint controller 220 can adjust the provisioning requirement of "ubuntu" to "ubuntu-d" to satisfy the cloud computing environment parameter of 'ubuntu-d".

At block 1306, the example cloud manager 100 determines whether to select another provisioning requirement to process. For example, the blueprint controller 220 can select a different one of the provisioning requirements 360 included in the blueprint 350 of FIG. 3B. In such examples, the blueprint controller 220 can select the configuration provisioning requirement that has a value of "medium" to process.

If, at block 1306, the example cloud manager 100 determines to select another provisioning requirement to process, control returns to block 1302 to select another provisioning requirement to process. If, at block 1306, the example cloud manager 100 determines not to select another provisioning requirement to process, then, at block 1308, the cloud manager 100 generates a new blueprint based on the adjusted provisioning requirement(s). For example, the blueprint controller 220 can generate a new or revised version of the blueprint 136 of FIG. 1, the blueprint(s) 274 of FIG. 2, the blueprint 300 of FIG. 3A, the blueprint 350 of FIG. 3B, etc.

At block 1310, the example cloud manager 100 stores the new blueprint in a database. For example, the blueprint controller 220 can store the new or revised version of the blueprint 136 of FIG. 1, the blueprint(s) 274 of FIG. 2, the blueprint 300 of FIG. 3A, the blueprint 350 of FIG. 3B, etc., in the database 270 (FIG. 2) as one of the blueprint(s) 274. In response to storing the new blueprint in the database, control returns to block 1018 of the example of FIG. 10 to deploy the virtual resource(s) to the cloud computing environment.

Figure 14:
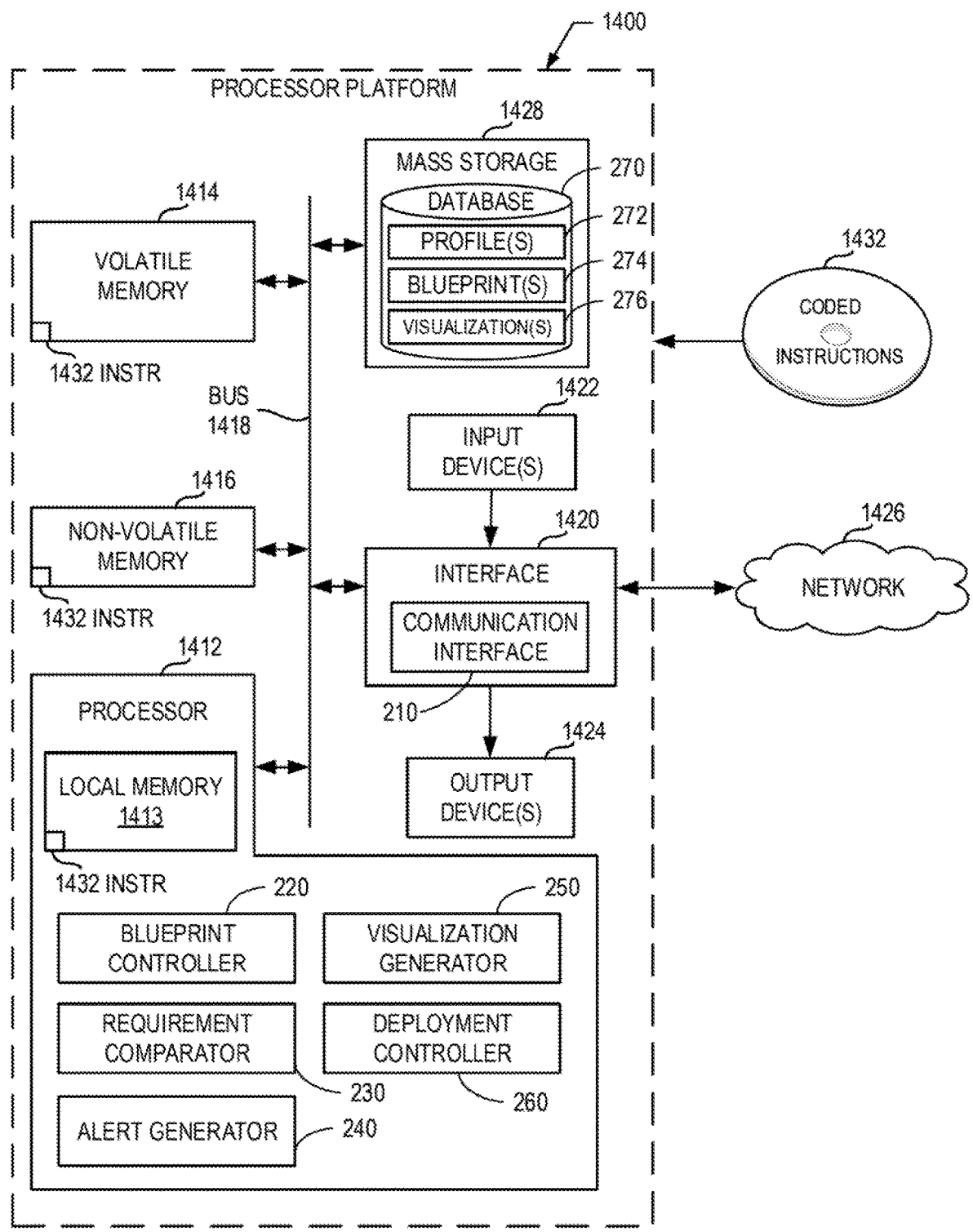
FIG. 14 is a block diagram of an example processing platform structured to execute the example machine readable instructions of FIGS. 10-13 to implement the example cloud manager of FIGS. 1 and/or 2.

FIG. 14 is a block diagram of an example processor platform 1400 structured to execute the instructions of FIGS. 10-13 to implement the cloud manager of FIGS. 1 and/or 2. The processor platform 1400 can be, for example, a server, a personal computer, a workstation, a self-learning machine (e.g., a neural network), or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1412 implements the example blueprint controller 220, the example requirement comparator 230, the example alert generator 240, the example visualization generator 250, and the example deployment controller 260 of FIG. 2.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface. In this example, the interface circuit 1420 implements the example communication interface 210 of FIG. 2.

In the illustrated example, one or more input devices 1422 are connected to the interface circuit 1420. The input device(s) 1422 permit(s) a user to enter data and/or commands into the processor 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives. In this example, the one or more mass storage devices 1428 implement the example database 270, the example profile(s) 272, the example blueprint(s) 274, and the example visualization(s) 276 of FIG. 2.

Example machine executable instructions 1432 represented in FIGS. 10-13 may be stored in the mass storage device 1428, in the volatile memory 1414, in the non-volatile memory 1416, and/or on a removable non-transitory computer readable storage medium such as a CD or DVD.

From the foregoing, it will be appreciated that example methods, apparatus, and articles of manufacture have been disclosed that generate virtual resource provisioning visualizations. The disclosed methods, apparatus, and articles of manufacture expose the decision-making process executed by a policy-based virtual resource provisioning engine by generating graphical representations of different stages of a provisioning lifecycle. The disclosed methods, apparatus, and articles of manufacture visualize the different stages with a user-interface model that provides the rationale and additional diagnostic information for which of the provisioning requirements are satisfied and which of the provisioning requirements are not satisfied to improve compatibility between provisioning requirements and provisioned virtual resources. The disclosed methods, apparatus, and articles of manufacture improve the efficiency of using a computing device by provisioning virtual resources that ensure compatibility between provisioning requirements and parameters associated with cloud computing environments hosted by cloud providers. The disclosed methods, apparatus and articles of manufacture are accordingly directed to one or more improvement(s) in the functioning of a computer.

Example methods, apparatus, systems, and articles of manufacture to generate virtual resource provisioning visualizations are disclosed herein. Further examples and combinations thereof include the following:

Example 1 includes an apparatus to generate a visualization associated with provisioning a virtual resource to a cloud computing environment, the apparatus comprising a visualization generator to generate a visualization based on a comparison of first provisioning requirements from a blueprint to parameters associated with the cloud computing environment, the first provisioning requirements associated with the provisioning of the virtual resource to the cloud computing environment, a blueprint controller to adjust one or more of the first provisioning requirements to one or more second provisioning requirements in response to determining that the first provisioning requirements are not satisfied based on the visualization, and a deployment controller to deploy the virtual resource to the cloud computing environment based on the one or more second provisioning requirements.

Example 2 includes the apparatus of example 1, wherein the virtual resource is a first virtual resource, the blueprint is a first blueprint, and the blueprint controller is to generate a second blueprint based on the one or more second provisioning requirements, and store the second blueprint in a database, and the deployment controller is to deploy a second virtual resource based on the second blueprint.

Example 3 includes the apparatus of example 1, further including a requirement comparator to determine whether the first provisioning requirements satisfy the parameters associated with a visualization layer of the visualization, in response to determining that the first provisioning requirements do not satisfy the parameters associated with the visualization layer, identify the visualization layer as a non-compliant visualization layer, and identify the cloud computing environment as a non-compliant cloud computing environment based on the non-compliant visualization layer.

Example 4 includes the apparatus of example 3, wherein the visualization is a first visualization, and wherein the blueprint controller is to adjust one or more of the first provisioning requirements associated with the non-compliant visualization layer to the one or more of the second provisioning requirements, the one or more of the second provisioning requirements to cause the visualization layer to satisfy the parameters, and the visualization generator is to generate a second visualization based on the one or more of the second provisioning requirements, the second visualization to display the visualization layer as a compliant visualization layer and the cloud computing environment as a compliant cloud computing environment.

Example 5 includes the apparatus of example 1, further including a requirement comparator to determine whether the first provisioning requirements satisfy the parameters associated with a plurality of visualization layers of the visualization, in response to determining that the first provisioning requirements satisfy the parameters associated with the plurality of the visualization layers, identify the plurality of the visualization layers as compliant visualization layers, and identify the cloud computing environment as a compliant cloud computing environment based on the plurality of the compliant visualization layers, and the deployment controller is to deploy the virtual resource to the cloud computing environment in response to identifying the cloud computing environment as the compliant cloud computing environment.

Example 6 includes the apparatus of example 1, wherein the visualization is a first visualization associated with a first provisioning stage of a plurality of provisioning stages, the parameters are first parameters associated with the first provisioning stage, the plurality of the provisioning stages including a second provisioning stage, and further including a requirement comparator to compare the first provisioning requirements to second parameters associated with the second provisioning stage, the visualization generator is to generate a second visualization based on the comparison, and the deployment controller is to deploy the virtual resource to the cloud computing environment in response to determining that first provisioning requirements satisfy the first parameters based on the first visualization and the second parameters based on the second visualization.

Example 7 includes the apparatus of example 1, further including an alert generator to generate an alert to a computing device in response to determining that the first provisioning requirements are not satisfied based on the visualization, a communication interface to obtain a command from the computing device to modify the blueprint, and the blueprint controller to adjust the one or more of the first provisioning requirements to the one or more second provisioning requirements based on the modified blueprint.

Example 8 includes a non-transitory computer readable storage medium comprising instructions that, when executed, cause at least one machine to at least generate a visualization based on a comparison of first provisioning requirements from a blueprint to parameters associated with a cloud computing environment, the first provisioning requirements associated with a provisioning of a virtual resource to the cloud computing environment, adjust one or more of the first provisioning requirements to one or more second provisioning requirements in response to determining that the first provisioning requirements are not satisfied based on the visualization, and deploy the virtual resource to the cloud computing environment based on the one or more second provisioning requirements.

Example 9 includes the non-transitory computer readable storage medium of example 8, wherein the virtual resource is a first virtual resource, the blueprint is a first blueprint, and the instructions, when executed, cause the at least one machine to generate a second blueprint based on the one or more second provisioning requirements, store the second blueprint in a database, and deploy a second virtual resource based on the second blueprint.

Example 10 includes the non-transitory computer readable storage medium of example 8, wherein the instructions, when executed, cause the at least one machine to determine whether the first provisioning requirements satisfy the parameters associated with a visualization layer of the visualization, in response to determining that the first provisioning requirements do not satisfy the parameters associated with the visualization layer, identify the visualization layer as a non-compliant visualization layer, and identify the cloud computing environment as a non-compliant cloud computing environment based on the non-compliant visualization layer.

Example 11 includes the non-transitory computer readable storage medium of example 10, wherein the visualization is a first visualization, and the instructions, when executed, cause the at least one machine to adjust one or more of the first provisioning requirements associated with the non-compliant visualization layer to the one or more of the second provisioning requirements, the one or more of the second provisioning requirements to cause the visualization layer to satisfy the parameters, and generate a second visualization based on the one or more of the second provisioning requirements, the second visualization to display the visualization layer as a compliant visualization layer and the cloud computing environment as a compliant cloud computing environment.

Example 12 includes the non-transitory computer readable storage medium of example 8, wherein the instructions, when executed, cause the at least one machine to determine whether the first provisioning requirements satisfy the parameters associated with a plurality of visualization layers of the visualization, in response to determining that the first provisioning requirements satisfy the parameters associated with the plurality of the visualization layers, identify the plurality of the visualization layers as compliant visualization layers, identify the cloud computing environment as a compliant cloud computing environment based on the plurality of the compliant visualization layers, and wherein the virtual resource is deployed to the cloud computing environment in response to identifying the cloud computing environment as the compliant cloud computing environment.

Example 13 includes the non-transitory computer readable storage medium of example 8, wherein the visualization is a first visualization associated with a first provisioning stage of a plurality of provisioning stages, the parameters are first parameters associated with the first provisioning stage, the plurality of the provisioning stages including a second provisioning stage, and the instructions, when executed, cause the at least one machine to compare the first provisioning requirements to second parameters associated with the second provisioning stage, generate a second visualization based on the comparison, and wherein the virtual resource is deployed to the cloud computing environment in response to determining that first provisioning requirements satisfy the first parameters based on the first visualization and the second parameters based on the second visualization.

Example 14 includes the non-transitory computer readable storage medium of example 8, wherein the instructions, when executed, cause the at least one machine to generate an alert to a computing device in response to determining that the first provisioning requirements are not satisfied based on the visualization, obtain a command from the computing device to modify the blueprint, and adjust the one or more of the first provisioning requirements to the one or more second provisioning requirements based on the modified blueprint.

Example 15 includes a method to generate a visualization associated with provisioning a virtual resource to a cloud computing environment, the method comprising generating a visualization based on a comparison of first provisioning requirements from a blueprint to parameters associated with the cloud computing environment, the first provisioning requirements associated with the provisioning of the virtual resource to the cloud computing environment, adjusting one or more of the first provisioning requirements to one or more second provisioning requirements in response to determining that the first provisioning requirements are not satisfied based on the visualization, and deploying the virtual resource to the cloud computing environment based on the one or more second provisioning requirements.

Example 16 includes the method of example 15, wherein the virtual resource is a first virtual resource, the blueprint is a first blueprint, and further including generating a second blueprint based on the one or more second provisioning requirements, storing the second blueprint in a database, and deploying a second virtual resource based on the second blueprint.

Example 17 includes the method of example 15, further including determining whether the first provisioning requirements satisfy the parameters associated with a visualization layer of the visualization, in response to determining that the first provisioning requirements do not satisfy the parameters associated with the visualization layer, identifying the visualization layer as a non-compliant visualization layer, and identifying the cloud computing environment as a non-compliant cloud computing environment based on the non-compliant visualization layer.

Example 18 includes the method of example 17, wherein the visualization is a first visualization, and further including adjusting one or more of the first provisioning requirements associated with the non-compliant visualization layer to the one or more of the second provisioning requirements, the one or more of the second provisioning requirements to cause the visualization layer to satisfy the parameters, and generating a second visualization based on the one or more of the second provisioning requirements, the second visualization displaying the visualization layer as a compliant visualization layer and the cloud computing environment as a compliant cloud computing environment.

Example 19 includes the method of example 15, further including determining whether the first provisioning requirements satisfy the parameters associated with a plurality of visualization layers of the visualization, in response to determining that the first provisioning requirements satisfy the parameters associated with the plurality of the visualization layers, identifying the plurality of the visualization layers as compliant visualization layers, identifying the cloud computing environment as a compliant cloud computing environment based on the plurality of the compliant visualization layers, and wherein the virtual resource is deployed to the cloud computing environment in response to identifying the cloud computing environment as the compliant cloud computing environment.

Example 20 includes the method of example 15, wherein the visualization is a first visualization associated with a first provisioning stage of a plurality of provisioning stages, the parameters are first parameters associated with the first provisioning stage, the plurality of the provisioning stages including a second provisioning stage, and further including comparing the first provisioning requirements to second parameters associated with the second provisioning stage, generating a second visualization based on the comparison, and wherein the virtual resource is deployed to the cloud computing environment in response to determining that first provisioning requirements satisfy the first parameters based on the first visualization and the second parameters based on the second visualization.

Example 21 includes the method of example 15, further including generating an alert to a computing device in response to determining that the first provisioning requirements are not satisfied based on the visualization, obtaining a command from the computing device to modify the blueprint, and adjusting the one or more of the first provisioning requirements to the one or more second provisioning requirements based on the modified blueprint.

Example 22 includes an apparatus to generate a visualization associated with provisioning a virtual resource to a cloud computing environment, the apparatus comprising means for generating a visualization based on a comparison of first provisioning requirements from a blueprint to parameters associated with the cloud computing environment, the first provisioning requirements associated with the provisioning of the virtual resource to the cloud computing environment, means for adjusting one or more of the first provisioning requirements to one or more second provisioning requirements in response to determining that the first provisioning requirements are not satisfied based on the visualization, and means for deploying the virtual resource to the cloud computing environment based on the one or more second provisioning requirements.

Example 23 includes the apparatus of example 22, wherein the virtual resource is a first virtual resource, the blueprint is a first blueprint, and wherein the means for generating is first means for generating, and further including second means for generating a second blueprint based on the one or more second provisioning requirements, means for storing the second blueprint in a database, and the means for deploying to deploy a second virtual resource based on the second blueprint.

Example 24 includes the apparatus of example 22, further including means for comparing to determine whether the first provisioning requirements satisfy the parameters associated with a visualization layer of the visualization, in response to determining that the first provisioning requirements do not satisfy the parameters associated with the visualization layer, identify the visualization layer as a non-compliant visualization layer, and identify the cloud computing environment as a non-compliant cloud computing environment based on the non-compliant visualization layer.

Example 25 includes the apparatus of example 24, wherein the visualization is a first visualization, the means for adjusting is first means for adjusting, and further including second means for adjusting one or more of the first provisioning requirements associated with the non-compliant visualization layer to the one or more of the second provisioning requirements, the one or more of the second provisioning requirements to cause the visualization layer to satisfy the parameters, and the means for generating to generate a second visualization based on the one or more of the second provisioning requirements, the second visualization to display the visualization layer as a compliant visualization layer and the cloud computing environment as a compliant cloud computing environment.

Example 26 includes the apparatus of example 22, further including means for comparing to determine whether the first provisioning requirements satisfy the parameters associated with a plurality of visualization layers of the visualization, in response to determining that the first provisioning requirements satisfy the parameters associated with the plurality of the visualization layers, identify the plurality of the visualization layers as compliant visualization layers, and identify the cloud computing environment as a compliant cloud computing environment based on the plurality of the compliant visualization layers, and the means for deploying to deploy the virtual resource to the cloud computing environment in response to identifying the cloud computing environment as the compliant cloud computing environment.

Example 27 includes the apparatus of example 22, wherein the visualization is a first visualization associated with a first provisioning stage of a plurality of provisioning stages, the parameters are first parameters associated with the first provisioning stage, the plurality of the provisioning stages including a second provisioning stage, and further including means for comparing to compare the first provisioning requirements to second parameters associated with the second provisioning stage, the means for generating to generate a second visualization based on the comparison, and the means for deploying to deploy the virtual resource to the cloud computing environment in response to determining that first provisioning requirements satisfy the first parameters based on the first visualization and the second parameters based on the second visualization.

Example 28 includes the apparatus of example 22, wherein the means for generating is first means for generating, the means for adjusting is first means for adjusting, and further including second means for generating an alert to a computing device in response to determining that the first provisioning requirements are not satisfied based on the visualization, means for obtaining a command from the computing device to modify the blueprint, and second means for adjusting the one or more of the first provisioning requirements to the one or more second provisioning requirements based on the modified blueprint.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to generate visualizations associated with provisioning virtual resources to a cloud computing environment, the apparatus comprising:
   a visualization generator to generate a first visualization based on a first comparison of first provisioning requirements from a blueprint to first parameters, the first parameters associated with the cloud computing environment, the first provisioning requirements associated with the provisioning of the virtual resources to the cloud computing environment, the first visualization corresponding to a first provisioning stage of a provisioning lifecycle;
   a blueprint controller to adjust one or more of the first provisioning requirements of the blueprint to one or more second provisioning requirements after a determination that the first provisioning requirements are not satisfied based on the first visualization;
   the visualization generator to generate a second visualization based on a second comparison of the one or more second provisioning requirements to second parameters associated with the cloud computing environment, the second visualization corresponding to a second provisioning stage of the provisioning lifecycle; and
   a deployment controller to deploy the virtual resources to the cloud computing environment based on the one or more second provisioning requirements, at least one of the visualization generator, the blueprint controller, or the deployment controller to be implemented with hardware.

2. The apparatus of claim 1, wherein the virtual resources include a first virtual resource, the blueprint is a first blueprint, and the blueprint controller is to:

generate a second blueprint based on the one or more second provisioning requirements; and store the second blueprint in a database; and the deployment controller is to deploy a second virtual resource of the virtual resources based on the second blueprint.

3. The apparatus of claim 1, further including a requirement comparator to:

determine whether the first provisioning requirements satisfy the first parameters associated with a visualization layer of the first visualization;

after a determination that the first provisioning requirements do not satisfy the first parameters associated with the visualization layer, identify the visualization layer as a non-compliant visualization layer; and identify the cloud computing environment as a non-compliant cloud computing environment based on the non-compliant visualization layer.

4. The apparatus of claim 3, wherein:

the blueprint controller is to adjust the one or more of the first provisioning requirements associated with the non-compliant visualization layer to the one or more second provisioning requirements, the one or more second provisioning requirements to cause the visualization layer to satisfy the first parameters; and the visualization generator is to generate a third visualization based on the one or more second provisioning requirements, the third visualization to display the visualization layer as a compliant visualization layer and the cloud computing environment as a compliant cloud computing environment.

5. The apparatus of claim 1, further including a requirement comparator to:

determine whether the first provisioning requirements satisfy the first parameters associated with a plurality of visualization layers of the first visualization;

after a determination that the first provisioning requirements satisfy the first parameters associated with the plurality of the visualization layers, identify the plurality of the visualization layers as compliant visualization layers; and identify the cloud computing environment as a compliant cloud computing environment based on the plurality of the compliant visualization layers; and the deployment controller is to deploy the virtual resources to the cloud computing environment after an identification of the cloud computing environment as the compliant cloud computing environment.

6. The apparatus of claim 1, further including:

a requirement comparator to compare the one or more second provisioning requirements to the second parameters associated with the second provisioning stage; and the visualization generator is to generate the second visualization based on the second comparison; and the deployment controller is to deploy the virtual resources to the cloud computing environment after a first determination that the one or more second provisioning requirements satisfy the first parameters based on the first visualization and a second determination that the one or more second provisioning requirements satisfy the second parameters based on the second visualization.

7. The apparatus of claim 1, further including:

an alert generator to generate an alert to a computing device after a determination that the first provisioning requirements are not satisfied based on the first visualization;

a communication interface to obtain a command from the computing device to modify adjust the blueprint; and the blueprint controller to adjust the one or more of the first provisioning requirements to the one or more second provisioning requirements based on the adjusted blueprint.

8. A non-transitory computer readable storage medium comprising instructions that, when executed, cause at least one machine to at least:

generate a first visualization based on a first comparison of first provisioning requirements from a blueprint to first parameters, the first parameters associated with a cloud computing environment, the first provisioning requirements associated with a provisioning of a virtual resource to the cloud computing environment, the first visualization corresponding to a first provisioning stage of a provisioning lifecycle;

adjust one or more of the first provisioning requirements of the blueprint to one or more second provisioning requirements after a determination that the first provisioning requirements are not satisfied based on the first visualization;

generate a second visualization based on a second comparison of the one or more second provisioning requirements to second parameters associated with the cloud computing environment, the second visualization corresponding to a second provisioning stage of the provisioning lifecycle; and deploy the virtual resource to the cloud computing environment based on the one or more second provisioning requirements.

9. The non-transitory computer readable storage medium of claim 8, wherein the virtual resource is a first virtual resource, the blueprint is a first blueprint, and the instructions, when executed, cause the at least one machine to:

generate a second blueprint based on the one or more second provisioning requirements;

store the second blueprint in a database; and deploy a second virtual resource based on the second blueprint.

10. The non-transitory computer readable storage medium of claim 8, wherein the instructions, when executed, cause the at least one machine to:

determine whether the first provisioning requirements satisfy the first parameters associated with a visualization layer of the first visualization;

after a determination that the first provisioning requirements do not satisfy the first parameters associated with the visualization layer, identify the visualization layer as a non-compliant visualization layer; and identify the cloud computing environment as a non-compliant cloud computing environment based on the non-compliant visualization layer.

11. The non-transitory computer readable storage medium of claim 10, wherein the instructions, when executed, cause the at least one machine to:

adjust the one or more of the first provisioning requirements associated with the non-compliant visualization layer to the one or more second provisioning requirements, the one or more second provisioning requirements to cause the visualization layer to satisfy the first parameters; and generate a third visualization based on the one or more second provisioning requirements, the third visualization to display the visualization layer as a compliant visualization layer and the cloud computing environment as a compliant cloud computing environment.

12. The non-transitory computer readable storage medium of claim 8, wherein the instructions, when executed, cause the at least one machine to:
  determine whether the first provisioning requirements satisfy the first parameters associated with a plurality of visualization layers of the first visualization;
  after a determination that the first provisioning requirements satisfy the first parameters associated with the plurality of the visualization layers, identify the plurality of the visualization layers as compliant visualization layers;
  identify the cloud computing environment as a compliant cloud computing environment based on the plurality of the compliant visualization layers; and wherein
  the virtual resource is deployed to the cloud computing environment after an identification of the cloud computing environment as the compliant cloud computing environment.

13. The non-transitory computer readable storage medium of claim 8, wherein the instructions, when executed, cause the at least one machine to:
  compare the one or more second provisioning requirements to the second parameters associated with the second provisioning stage;
  and wherein
  the virtual resource is deployed to the cloud computing environment a first determination that the one or more second provisioning requirements satisfy the first parameters based on the first visualization and a second determination that the one or more second provisioning requirements satisfy the second parameters based on the second visualization.

14. The non-transitory computer readable storage medium of claim 8, wherein the instructions, when executed, cause the at least one machine to:
  generate an alert to a computing device after a determination that the first provisioning requirements are not satisfied based on the first visualization;
  obtain a command from the computing device to adjust the blueprint; and
  adjust the one or more of the first provisioning requirements to the one or more second provisioning requirements based on the adjusted blueprint.

15. A method to generate visualizations associated with provisioning a virtual resource to a cloud computing environment, the method comprising:
  generating a first visualization based on a first comparison of first provisioning requirements from a blueprint to first parameters, the first parameters associated with the cloud computing environment, the first provisioning requirements associated with the provisioning of the virtual resource to the cloud computing environment, the first visualization corresponding to a first provisioning stage of a provisioning lifecycle;
  adjusting one or more of the first provisioning requirements of the blueprint to one or more second provisioning requirements after the first provisioning requirements are not satisfied by the first parameters;
  generating a second visualization based on a second comparison of the one or more second provisioning requirements to second parameters associated with the cloud computing environment, the second visualization corresponding to a second provisioning stage of the provisioning lifecycle; and
  deploying the virtual resource to the cloud computing environment based on the one or more second provisioning requirements.

16. The method of claim 15, wherein the virtual resource is a first virtual resource, the blueprint is a first blueprint, and the method further including:
  generating a second blueprint based on the one or more second provisioning requirements;
  storing the second blueprint in a database; and
  deploying a second virtual resource based on the second blueprint.

17. The method of claim 15, further including:
  determining whether the first provisioning requirements satisfy the first parameters associated with a visualization layer of the first visualization;
  after the first provisioning requirements do not satisfy the first parameters associated with the visualization layer, identifying the visualization layer as a non-compliant visualization layer; and
  identifying the cloud computing environment as a non-compliant cloud computing environment based on the non-compliant visualization layer.

18. The method of claim 17, further including:
  adjusting one or more of the first provisioning requirements associated with the non-compliant visualization layer to the one or more second provisioning requirements, the one or more second provisioning requirements to cause the visualization layer to satisfy the first parameters; and
  generating a third visualization based on the one or more second provisioning requirements, the third visualization displaying the visualization layer as a compliant visualization layer and the cloud computing environment as a compliant cloud computing environment.

19. The method of claim 15, further including:
  determining whether the first provisioning requirements satisfy the first parameters associated with a plurality of visualization layers of the first visualization;
  after determining that the first provisioning requirements satisfy the first parameters associated with the plurality of the visualization layers, identifying the plurality of the visualization layers as compliant visualization layers;
  identifying the cloud computing environment as a compliant cloud computing environment based on the plurality of the compliant visualization layers; and wherein
  the virtual resource is deployed to the cloud computing environment after the cloud computing environment is identified as the compliant cloud computing environment.

20. The method of claim 15, further including:
  comparing the one or more second provisioning requirements to the second parameters associated with the second provisioning stage;
  and wherein
  the virtual resource is deployed to the cloud computing environment after the one or more second provisioning requirements satisfy the first parameters based on the first visualization and the second parameters based on the second visualization.

21. The method of claim 15, further including:
  generating an alert to a computing device after the first provisioning requirements are not satisfied based on the first visualization;
  obtaining a command from the computing device to adjust the blueprint; and
  adjusting the one or more of the first provisioning requirements to the one or more second provisioning requirements based on the adjusted blueprint.

22. An apparatus to generate visualizations associated with provisioning a virtual resource to a cloud computing environment, the apparatus comprising:

means for generating a first visualization based on a comparison of first provisioning requirements from a blueprint to first parameters, the first parameters associated with the cloud computing environment, the first provisioning requirements associated with the provisioning of the virtual resource to the cloud computing environment, the first visualization corresponding to a first provisioning stage of a provisioning lifecycle;

means for adjusting one or more of the first provisioning requirements of the blueprint to one or more second provisioning requirements after a determination that the first provisioning requirements are not satisfied based on the first visualization;

the means for generating to generate a second visualization based on a second comparison of the one or more second provisioning requirements to second parameters associated with the cloud computing environment, the second visualization corresponding to a second provisioning stage of the provisioning lifecycle; and means for deploying the virtual resource to the cloud computing environment based on the one or more second provisioning requirements.

23. The apparatus of claim 22, wherein the virtual resource is a first virtual resource, the blueprint is a first blueprint, and further including:

the means for adjusting is to generate a second blueprint based on the one or more second provisioning requirements;

means for storing the second blueprint in a database; and the means for deploying to deploy a second virtual resource based on the second blueprint.

24. The apparatus of claim 22, further including means for comparing to:

determine whether the first provisioning requirements satisfy the first parameters associated with a visualization layer of the first visualization;

after a determination that the first provisioning requirements do not satisfy the first parameters associated with the visualization layer, identify the visualization layer as a non-compliant visualization layer; and identify the cloud computing environment as a non-compliant cloud computing environment based on the non-compliant visualization layer.

25. The apparatus of claim 24, wherein:

the means for adjusting is to adjust the one or more of the first provisioning requirements associated with the non-compliant visualization layer to the one or more second provisioning requirements, the one or more second provisioning requirements to cause the visualization layer to satisfy the first parameters; and the means for generating is to generate the second visualization based on the one or more second provisioning requirements, the second visualization to display the visualization layer as a compliant visualization layer and the cloud computing environment as a compliant cloud computing environment.

26. The apparatus of claim 22, wherein:

the means for generating is to:

determine whether the first provisioning requirements satisfy the first parameters associated with a plurality of visualization layers of the first visualization;

after a determination that the first provisioning requirements satisfy the first parameters associated with the plurality of the visualization layers, identify the plurality of the visualization layers as compliant visualization layers; and identify the cloud computing environment as a compliant cloud computing environment based on the plurality of the compliant visualization layers; and the means for deploying is to deploy the virtual resource to the cloud computing environment after an identification of the cloud computing environment as the compliant cloud computing environment.

27. The apparatus of claim 22, wherein:

the means for generating is to compare the one or more second provisioning requirements to the second parameters associated with the second provisioning stage; and the means for deploying is to deploy the virtual resource to the cloud computing environment after a determination that the one or more second provisioning requirements satisfy the first parameters based on the first visualization and the second parameters based on the second visualization.

28. The apparatus of claim 22, wherein the means for generating is first means for generating, and further including:

second means for generating an alert to a computing device after a determination that the first provisioning requirements are not satisfied by the first parameters;

means for obtaining a command from the computing device to adjust the blueprint; and the means for adjusting to adjust the one or more of the first provisioning requirements to the one or more second provisioning requirements based on the adjusted blueprint.

* * * * *